United States Patent
Zhang et al.

(10) Patent No.: US 8,891,356 B2
(45) Date of Patent: Nov. 18, 2014

(54) SYSTEM AND METHOD FOR MULTI-POINT HSDPA COMMUNICATION UTILIZING A MULTI-LINK RLC SUBLAYER

(75) Inventors: Danlu Zhang, San Diego, CA (US); Sharad Deepak Sambhwani, San Diego, CA (US); Rohit Kapoor, San Diego, CA (US); Jilei Hou, San Diego, CA (US); Weiyan Ge, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 111 days.

(21) Appl. No.: 13/169,874

(22) Filed: Jun. 27, 2011

(65) Prior Publication Data

US 2012/0163161 A1    Jun. 28, 2012

Related U.S. Application Data

(60) Provisional application No. 61/359,326, filed on Jun. 28, 2010, provisional application No. 61/374,212, filed on Aug. 16, 2010, provisional application No. 61/477,776, filed on Apr. 21, 2011, provisional application No. 61/483,020, filed on May 5, 2011.

(51) Int. Cl.
| | | |
|---|---|---|
| *G01R 31/08* | (2006.01) | |
| *G06F 11/00* | (2006.01) | |
| *H04L 1/18* | (2006.01) | |
| *H04L 25/14* | (2006.01) | |
| *H04W 28/04* | (2009.01) | |
| *H04W 76/02* | (2009.01) | |

(52) U.S. Cl.
CPC ............. *H04L 1/1874* (2013.01); *H04L 1/188* (2013.01); *H04L 1/1887* (2013.01); *H04L 25/14* (2013.01); *H04W 28/04* (2013.01); *H04W 76/025* (2013.01)
USPC .......................................... 370/216; 370/242

(58) Field of Classification Search
USPC .................. 370/216, 242, 328, 310, 329, 338
See application file for complete search history.

(56) References Cited

U.S. PATENT DOCUMENTS

| | | | | |
|---|---|---|---|---|
| 7,242,670 | B2 * | 7/2007 | Yi et al. | 370/252 |
| 7,551,596 | B2 * | 6/2009 | Kim et al. | 370/349 |

(Continued)

FOREIGN PATENT DOCUMENTS

| | | |
|---|---|---|
| CN | 101720562 A | 6/2010 |
| EP | 1284583 A2 | 2/2003 |

(Continued)

OTHER PUBLICATIONS

Catt: "Implicit Feedback in Support of Downlink CoMP", 3GPP Draft; R1-093522, 3RD Generation Partnership Project (3GPP), Mobile Competence Centre ; 650, Route Des Lucioles ; F-06921 Sophia-Antipolis Cedex ; France, No. Shenzhen, China; 20090819, Aug. 19, 2009 (Aug. 19, 2009), XP050351782,[retrieved on Aug. 19, 2009] paragraphs 2.1 to 2.2.

(Continued)

*Primary Examiner* — Warner Wong

(57) ABSTRACT

A method and apparatus for wireless communication may provide a multi-link RLC sublayer in an RNC capable of allocating RLC PDUs among a plurality of MAC entities for use in a Multi-Point HSDPA network. Some aspects of the disclosure address issues relating to out-of-order delivery of the RLC PDUs to a UE, such as unnecessary retransmissions. That is, the disclosed multi-link RLC may be capable of distinguishing between sequence number gaps that are caused by physical layer transmission failures and those caused merely by skew.

53 Claims, 13 Drawing Sheets

(56) References Cited

U.S. PATENT DOCUMENTS

| | | | |
|---|---|---|---|
| 7,710,922 B2 | 5/2010 | Lundh et al. | |
| 7,729,349 B2* | 6/2010 | Beckmann et al. | 370/390 |
| 7,864,722 B2* | 1/2011 | Yi et al. | 370/312 |
| 7,903,578 B2 | 3/2011 | Fischer | |
| 7,944,943 B2* | 5/2011 | Kekki et al. | 370/469 |
| 7,961,704 B2* | 6/2011 | Meyer et al. | 370/349 |
| 8,068,473 B2* | 11/2011 | Chun et al. | 370/342 |
| 8,068,497 B2* | 11/2011 | Terry et al. | 370/395.4 |
| 8,094,618 B2* | 1/2012 | Yi et al. | 370/329 |
| 8,144,662 B2 | 3/2012 | Xing et al. | |
| 8,605,674 B2* | 12/2013 | Park et al. | 370/329 |
| 8,638,723 B2* | 1/2014 | Cave et al. | 370/328 |
| 8,638,773 B2 | 1/2014 | Ho et al. | |
| 8,737,211 B2 | 5/2014 | Zhang et al. | |
| 2002/0021714 A1* | 2/2002 | Seguin | 370/469 |
| 2003/0129982 A1 | 7/2003 | Perini | |
| 2003/0171118 A1 | 9/2003 | Miya | |
| 2004/0224691 A1 | 11/2004 | Hadad | |
| 2005/0044130 A1 | 2/2005 | Sillasto et al. | |
| 2005/0074024 A1* | 4/2005 | Kim et al. | 370/432 |
| 2006/0033323 A1 | 2/2006 | Reynolds | |
| 2006/0203760 A1 | 9/2006 | Fukui et al. | |
| 2006/0274712 A1 | 12/2006 | Malladi et al. | |
| 2006/0276214 A1 | 12/2006 | Harris et al. | |
| 2007/0008990 A1* | 1/2007 | Torsner | 370/473 |
| 2007/0104150 A1 | 5/2007 | Fernandez-Corbaton et al. | |
| 2008/0069043 A1* | 3/2008 | Kimura et al. | 370/329 |
| 2008/0132263 A1 | 6/2008 | Yu et al. | |
| 2008/0225789 A1 | 9/2008 | Kim et al. | |
| 2008/0298322 A1* | 12/2008 | Chun et al. | 370/335 |
| 2008/0298332 A1* | 12/2008 | Erami | 370/338 |
| 2009/0010213 A1 | 1/2009 | Yamada et al. | |
| 2009/0036061 A1* | 2/2009 | Chun et al. | 455/68 |
| 2009/0041001 A1* | 2/2009 | Lee et al. | 370/345 |
| 2009/0103445 A1 | 4/2009 | Sammour et al. | |
| 2009/0193310 A1 | 7/2009 | Hashimoto | |
| 2009/0213729 A1 | 8/2009 | Zhang et al. | |
| 2009/0219881 A1* | 9/2009 | Kim | 370/329 |
| 2009/0245178 A1 | 10/2009 | Gholmieh et al. | |
| 2009/0245212 A1 | 10/2009 | Sambhwani et al. | |
| 2009/0257387 A1 | 10/2009 | Gholmieh et al. | |
| 2009/0270103 A1 | 10/2009 | Pani et al. | |
| 2009/0296643 A1 | 12/2009 | Cave et al. | |
| 2009/0296798 A1 | 12/2009 | Banna et al. | |
| 2009/0300456 A1 | 12/2009 | Pelletier et al. | |
| 2009/0310534 A1* | 12/2009 | Lindskog et al. | 370/328 |
| 2009/0323639 A1 | 12/2009 | Kim et al. | |
| 2009/0327830 A1* | 12/2009 | Lee et al. | 714/749 |
| 2010/0034087 A1 | 2/2010 | De Benedittis et al. | |
| 2010/0034114 A1 | 2/2010 | Kim et al. | |
| 2010/0034169 A1 | 2/2010 | Maheshwari et al. | |
| 2010/0034171 A1 | 2/2010 | Pelletier et al. | |
| 2010/0034176 A1 | 2/2010 | Heo et al. | |
| 2010/0067483 A1 | 3/2010 | Ahluwalia | |
| 2010/0110985 A1* | 5/2010 | Umesh et al. | 370/328 |
| 2010/0118723 A1 | 5/2010 | Pani et al. | |
| 2010/0130137 A1 | 5/2010 | Pelletier et al. | |
| 2010/0165830 A1 | 7/2010 | Amir et al. | |
| 2010/0222059 A1 | 9/2010 | Pani et al. | |
| 2010/0233962 A1 | 9/2010 | Johansson et al. | |
| 2010/0238829 A1 | 9/2010 | Sambhwani et al. | |
| 2010/0265883 A1 | 10/2010 | Attar et al. | |
| 2010/0296511 A1 | 11/2010 | Prodan et al. | |
| 2010/0303054 A1 | 12/2010 | Yang et al. | |
| 2011/0038313 A1 | 2/2011 | Park et al. | |
| 2011/0044168 A1 | 2/2011 | Nadas et al. | |
| 2011/0044297 A1* | 2/2011 | Lee et al. | 370/336 |
| 2011/0122962 A1 | 5/2011 | De Pasquale et al. | |
| 2011/0164560 A1* | 7/2011 | Ki et al. | 370/328 |
| 2011/0170495 A1* | 7/2011 | Earnshaw et al. | 370/329 |
| 2011/0222502 A1 | 9/2011 | Aminaka | |
| 2011/0228756 A1 | 9/2011 | Kim et al. | |
| 2011/0235519 A1 | 9/2011 | Racz et al. | |
| 2011/0235528 A1 | 9/2011 | Racz et al. | |
| 2011/0317642 A1 | 12/2011 | Eravelli et al. | |
| 2011/0317657 A1 | 12/2011 | Chmiel et al. | |
| 2012/0039169 A1 | 2/2012 | Susitaival et al. | |
| 2012/0057560 A1* | 3/2012 | Park et al. | 370/328 |
| 2012/0082096 A1* | 4/2012 | Cave et al. | 370/328 |
| 2012/0163205 A1 | 6/2012 | Zhang et al. | |
| 2012/0163315 A1* | 6/2012 | Govindappa et al. | 370/329 |
| 2012/0163338 A1 | 6/2012 | Zhang et al. | |
| 2012/0201219 A1 | 8/2012 | Wager et al. | |
| 2012/0201226 A1 | 8/2012 | Sambhwani et al. | |
| 2012/0281564 A1 | 11/2012 | Zhang et al. | |
| 2012/0320867 A1* | 12/2012 | Sarkkinen et al. | 370/329 |
| 2013/0016841 A1 | 1/2013 | Fong et al. | |
| 2013/0121247 A1 | 5/2013 | Seo et al. | |
| 2013/0155923 A1* | 6/2013 | Yi et al. | 370/310 |
| 2013/0194921 A1 | 8/2013 | Zhang et al. | |
| 2013/0194924 A1 | 8/2013 | Zhang et al. | |
| 2014/0056238 A1* | 2/2014 | Nammi et al. | 370/329 |
| 2014/0112255 A1* | 4/2014 | Kim et al. | 370/328 |
| 2014/0153520 A1* | 6/2014 | Shinohara et al. | 370/329 |

FOREIGN PATENT DOCUMENTS

| | | |
|---|---|---|
| EP | 1523134 A1 | 4/2005 |
| EP | 1672845 A1 | 6/2006 |
| EP | 1675426 A2 | 6/2006 |
| EP | 1773009 A2 | 4/2007 |
| EP | 1868394 A1 | 12/2007 |
| EP | 1950903 A1 | 7/2008 |
| EP | 2015526 A2 | 1/2009 |
| JP | 2005304060 A | 10/2005 |
| JP | 2008053851 A | 3/2008 |
| JP | 2010028714 A | 2/2010 |
| JP | 2010515357 A | 5/2010 |
| JP | 2010530197 A | 9/2010 |
| JP | 2011525336 A | 9/2011 |
| JP | 2013543706 A | 12/2013 |
| WO | 0230144 A1 | 4/2002 |
| WO | 03017711 A1 | 2/2003 |
| WO | WO-2005041493 A1 | 5/2005 |
| WO | 2006103136 A1 | 10/2006 |
| WO | 2007050238 A1 | 5/2007 |
| WO | 2008085351 A1 | 7/2008 |
| WO | 2008097544 A2 | 8/2008 |
| WO | 2008156268 A2 | 12/2008 |
| WO | 2009108808 | 9/2009 |
| WO | 2009155480 A1 | 12/2009 |
| WO | 2010064365 A1 | 6/2010 |
| WO | 2010088538 | 8/2010 |
| WO | 2010106635 A1 | 9/2010 |
| WO | 2010125738 A1 | 11/2010 |
| WO | 2010132186 A1 | 11/2010 |

OTHER PUBLICATIONS

Catt: "Measurement in CA", 3GPP Draft; R2-095485, 3RD Generation Partnership Project (3GPP), Mobile Competence Centre ; 650, Route Des Lucioles ; F-06921 Sophia-Antipolis Cedex ; France, No. Miyazaki; 20091012, Oct. 16, 2009 (Oct. 16, 2009), XP050390041, [retrieved on Oct. 4, 2009] paragraphs [02.2], [02.3].

David Soldani et al: "Strategies for Mobile Broadband Growth: Traffic Segmentation for Better Customer Experience", Vehicular Technology Conference (VTC Spring), 2011 IEEE 73RD, IEEE, May 15, 2011 (May 15, 2011), pp. 1-5, XP031896606, DOI: 10.1109/VETECS. 2011.5956203 ISBN: 978-1-4244-8332-7.

Ericsson: "Iub and Iur Congestion Control Concept for HSUPA and HSDPA", 3GPP Draft; R3-050545 IUBIUR CONG CTRL Disc, 3RD Generation Partnership Project (3GPP), Mobile Competence Centre ; 650, Route Des Lucioles ; F-06921 Sophia Antipolis Cedex ; France, vol. RAN WG3, No. Athens, Greece; 20050504, May 4, 2005 (May 4, 2005), XP050157970, [retrieved on May 4, 2005].

MCC Support: "Final Report of 3GPP TSG RAN WG1 #56bis v2.0.0 (Seoul, South Korea, 23 27 Mar., 2009)",3GPP Draft; Final-ReportWG1#56B-V200, 3RD Generation Partnership Project (3GPP), Mobile Competence Centre ; 650, Route Des Lucioles ; F-06921 Sophia-Antipolis Cedex France, San Francisco, USA; 20090505, May 5, 2009 (May 5, 2009), XP050339215,[ retrived on May 5, 2009] p. 11-p. 13 -p. 14 p. 43-p. 44 p. 54-p. 55.

(56) References Cited

OTHER PUBLICATIONS

Nadas et al., "Providing Congestion Control in the Iub Transport Network for HSDPA," Global Telecommunications Conference 2007, Ericsson Research, GLOBECOM '07, IEEE, Nov. 26-30, 2007, 5 pages.
Nokia: "No. Of Control Symbols", 3GPP Draft; R2-071227 Number of Control Symbols, 3RD Generation Partnership Project (3GPP), Mobile Competence Centre ; 650, Route Des Lucioles ; F-06921 Sophia-Anti Polis Cedex ; France, vol. Ran WG2, No. S t . Juliana s, Malta; 20070326-200703, Mar. 22, 2007 (Mar. 22, 2007), XP050602966, [retrieved on Mar. 22, 2007].
Nokia Siemens Networks et al: "Multi-cell transmission techniques for HSDPA", 3GPP Draft; R1-104913, 3RD Generation Partnership Project (3GPP), Mobile Competence Centre ; 650, Route Des Lucioles ; F-06921 Sophia-Antipolis Cedex ; France, vol . RAN WG1, No. Madrid, Spain; 20100823, Aug. 17, 2010 (Aug. 17, 2010), XP050450059, [retrieved on Aug. 17, 2010] paragraphs [003.], [03.5], [04.1].
Qualcomm Europe: "TP for feedback in support of DL CoMP for LTEA TR", 3GPP Draft; R1-092290 TP for TR 36.814 on DL COMP Feedback, 3RD Generation Partnership Project (3GPP), Mobile Competence Centre ; 650, Route Des Lucioles ; F-06921 Sophia-Antipolis Cedex; France, No. San Francisco, USA; 20090609, Jun. 9, 2009 (Jun. 9, 2009) XP050339699, [retrieved on Jun. 9, 2009].
Qualcomm Incorporated: "DL Scheduling, RLC and Flow Control assumption for Inter-NodeB Multi-Point Transmissions", 3GPP Draft; R1-110126_DL_SCH_RLC_FLOW_CONTROL_ASS_INTER-NODEB_MP-HSDPA, 3RD Generation Partnership Project (3GPP), Mobile Competence Centre ; 650, Route Des Lucioles ; F-06921 Sophia-Antipolis Cedex ;France, vol. RAN WG1, No. Dublin, Ireland; 20110117, Jan. 11, 2011 (Jan. 11, 2011), XP050474375.
Qualcomm Incorporated: "On deploying DC-HSDPA UEs in Single Frequency Networks", R1-104157, 3RD Generation Partnership Project (3GPP), Mobile Competence Centre ; 650, Route Des Lucioles ; F-06921 Sophia-Antipolis Cedex ; France, vol. . RAN-WG1, No. Dresden, Germany; 20100629 Jul. 5, 2010 (Jul. 5, 2010), XP002633072, Retrieved from the Internet: URL:http://www.3gpp.org/ftp/tsg_ran/WG1_RL 1/TSGR1_61b/Docs/R1-104157.zip [retrieved on Apr. 14, 2011] .
Qualcomm Incorporated: "On Inter-site Multi-Point Transmission in HSDPA", 3GPP Draft; R2-115196 on Inter-Site Multi-Point Transmisston in HSDPA, 3RD Generation Partnership Project (3GPP) , Mobile Competence Centre ; 650, Route Des Lucioles ; F-06921 Sophia-Antipolis Cedex ; France, vol. RAN WG2, No. Zhuhai; 20111010, Oct. 4, 2011 (Oct. 4, 2011), XP050540985, [retrieved on Oct. 4, 2011] paragraphs [02.3] , [0003] figure 2; table 1.
Qualcomm Incorporated: "TCP Performance Evaluation of SF-DC Inter NodeB Aggregation Assuming Realistic RLC, Flow Control and Iub Congestions Control", 3GPP Draft; R1-112686_TCP_PERF_EVAL_SF_DC_INTER_NODEB_REALISTIC_RLC_FC_CC, 652 Route Des Lucioles ; F-06921 Sophia-Antipolis Cedex ; France, vol. RAN WG1, No. Athens, Greece; 20110822, Aug. 16, 2011 (Aug. 16, 2011), XP050537724, [retrieved on Aug. 16, 2011].
Samsung: "Selection of primary scheduling Node B in SHO", 3GPP Draft; R1-040492, 3RD Generation Partnership Project (3GPP), Mobile Competence Centre ; 650, Route Des Lucioles ; F-06921 Sophia-Antipolis Cedex ; France, vol. RAN WG1, No. Montreal, Canada; 20040506, May 6, 2004 (May 6, 2004), XP050098858.
Sharp, "Simultaneous Retransmission of Different Redundancy Versions during the HARQ for DL CoMP," 3GPP TSG-RAN WG1#58Bis, R1-094026, Miyazaki, Japan, Oct. 12-16, 2009, pp. 1-3.
Vulkan et al., "Congestion Control in Evolved HSPA Systems," 2011 IEEE 73rd Vehicular Technology Conference (VTC Spring), pp. 1-6.
Anand J, et al: "Architecture, implementation, and evaluation of a concurrent multi-path real-time transport control protocol," Military Communications Conference, 2007. MILCOM 2007. IEEE. IEEE, Piscataway, NJ, USA, Oct. 29, 2007 (Oct. 29, 2007), pp. 1-7, XP031232821, Introduction sections II.A and II.B.
Dong, Yu, et al: "A concurrent transmission control protocol," Communications, Circuits, and Systems Proceedings, 2006 International Conference on, IEEE, PI, Jun 1, 2006, pp. 1796-1800, XP031010769, abstract, section II.
ETSI: "Digital cellular telecommunications system (Phase 2+); General Packet Radio Service (GPRS); Mobile Station (MS)—Base Station System (BSS) interface; Radio Link Control/ Medium Access Control (RLC/MAC) protocol (GSM 04.60 proposed version 1.1.0)", GSM 04.60, Feb. 19, 1998 (Feb. 19, 1998), pp. 48-51, XP000002657121, Retrieved from the Internet: URL:ww.etsi.org [retrieved on Aug. 18, 2011].
International Search Report and Written Opinion—PCT/US2011/042247ISA/EPO—Aug. 30, 2011.
Sandrasegaran K., et al., "Delay-Prioritized Scheduling (DPS) for Real Time Traffic in 3GPP LTE System", IEEE Wireless Communications and Networking Conference (WCNC), pp. 1-6, 2010.
Qualcomm Incorporated: "On deploying DC-HSDPA UEs in Single Frequency Networks", 3GPP TSG-RAN WG1#61b R1-103859, Jun. 21, 2010.
GSM: "Digital cellular telecommunications system (Phase 2+), General Packet Radio Service (GPRS), Mobile Station (MS)—Base Station System (BSS) interface, Radio Link Control/Medium Access Control (RLC/MAC) protocol (GSM 04.60 proposed version 6.1.0, Release 1997)", Draft EN 301 349 V6.1.0 (Aug. 1998), pp. 1-152.

\* cited by examiner

SYSTEM AND METHOD FOR MULTI-POINT HSDPA COMMUNICATION UTILIZING A MULTI-LINK RLC SUBLAYER

CROSS-REFERENCE TO RELATED APPLICATIONS

This application claims priority to and the benefit of provisional patent application No. 61/359,326, filed in the United States Patent and Trademark Office on Jun. 28, 2010; provisional patent application No. 61/374,212, filed in the United States Patent and Trademark Office on Aug. 16, 2010; provisional patent application No. 61/477,776, filed in the United States Patent and Trademark Office on Apr. 21, 2011; and provisional patent application No. 61/483,020 filed in the United States Patent and Trademark Office on May 5, 2011, the entire contents of which are incorporated herein by reference.

BACKGROUND

1. Field

Aspects of the present disclosure relate generally to wireless communication systems, and more particularly, to RLC-layer algorithms for managing packets sent over a plurality of downlink cells for aggregation.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

As an example, Multi-Point HSDPA has been recently introduced, in which plural cells can provide high-speed downlink communication to a mobile station, such that the mobile station is capable of aggregating the transmissions from those cells, within the same frequency carrier. As a relatively new system, various issues arise in this system that may not have been addressed in other downlink carrier aggregation systems such as DC-HSDPA. Thus, there is a need to identify and address issues relating to system-level architecture, packet flow control, mobility, and others.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure, nor to delineate the scope of any or all aspects of the disclosure. Its sole purpose is to present some concepts of one or more aspects of the disclosure in a simplified form as a prelude to the more detailed description that is presented later.

In accordance with various aspects of the disclosure, a method and apparatus for wireless communication may provide a multi-link RLC sublayer in an RNC capable of allocating RLC PDUs among a plurality of MAC entities for use in a Multi-Point HSDPA network. Some aspects of the disclosure address issues relating to out-of-order delivery of the RLC PDUs to a UE, such as unnecessary retransmissions. That is, the disclosed multi-link RLC may be capable of distinguishing between sequence number gaps that are caused by physical layer transmission failures and those caused merely by skew.

In one aspect, the disclosure provides a method of wireless communication including allocating, from a single RLC entity, a plurality of RLC PDUs among a plurality of MAC entities, and sending the plurality of RLC PDUs to the plurality of MAC entities according to the allocation.

Another aspect of the disclosure provides a method of wireless communication including allocating from a single RLC entity a plurality of RLC PDUs among a plurality of MAC entities, sending the plurality of RLC PDUs to the plurality of MAC entities according to the allocation, initiating a timer corresponding to the allocation, and ignoring a status PDU that indicates a gap corresponding to the timer until the timer expires.

Yet another aspect of the disclosure provides an apparatus for wireless communication that includes means for allocating, from a single RLC entity, a plurality of RLC PDUs among a plurality of MAC entities, and means for sending the plurality of RLC PDUs to the plurality of MAC entities according to the allocation.

Still another aspect of the disclosure provides an apparatus for wireless communication that includes means for allocating from a single RLC entity a plurality of RLC PDUs among a plurality of MAC entities, means for sending the plurality of RLC PDUs to the plurality of MAC entities according to the allocation, means for initiating a timer corresponding to the allocation, and means for ignoring a status PDU that indicates a gap corresponding to the timer until the timer expires.

Still another aspect of the disclosure provides a computer program product that includes a computer-readable medium having code for causing a computer to allocate, from a single RLC entity, a plurality of RLC PDUs among a plurality of MAC entities, and code for causing a computer to send the plurality of RLC PDUs to the plurality of MAC entities according to the allocation.

Still another aspect of the disclosure provides a computer program product that includes a computer-readable medium having code for causing a computer to allocate from a single RLC entity a plurality of RLC PDUs among a plurality of MAC entities, code for causing a computer to send the plurality of RLC PDUs to the plurality of MAC entities according to the allocation, code for causing a computer to initiate a timer corresponding to the allocation, and code for causing a computer to ignore a status PDU that indicates a gap corresponding to the timer until the timer expires.

Still another aspect of the disclosure provides an apparatus for wireless communication that includes at least one processor and a memory coupled to the at least one processor, wherein the at least one processor is configured to allocate, from a single RLC entity, a plurality of RLC PDUs among a plurality of MAC entities, and to send the plurality of RLC PDUs to the plurality of MAC entities according to the allocation.

Still another aspect of the disclosure provides an apparatus for wireless communication that includes at least one processor and a memory coupled to the at least one processor, wherein the at least one processor is configured to allocate from a single RLC entity a plurality of RLC PDUs among a plurality of MAC entities, to send the plurality of RLC PDUs to the plurality of MAC entities according to the allocation, to initiate a timer corresponding to the allocation, and to ignore a status PDU that indicates a gap corresponding to the timer until the timer expires.

To the accomplishment of the foregoing and related ends, the one or more aspects of the disclosure described herein may include the features hereinafter fully described and particularly pointed out in the claims. The following description and the annexed drawings set forth in detail certain illustrative features of the one or more aspects of the disclosure. These features are indicative, however, of but a few of the various ways in which the principles of various aspects of the disclosure may be employed, and this description is intended to include all such aspects of the disclosure, and their equivalents.

DETAILED DESCRIPTION

Figure 1:
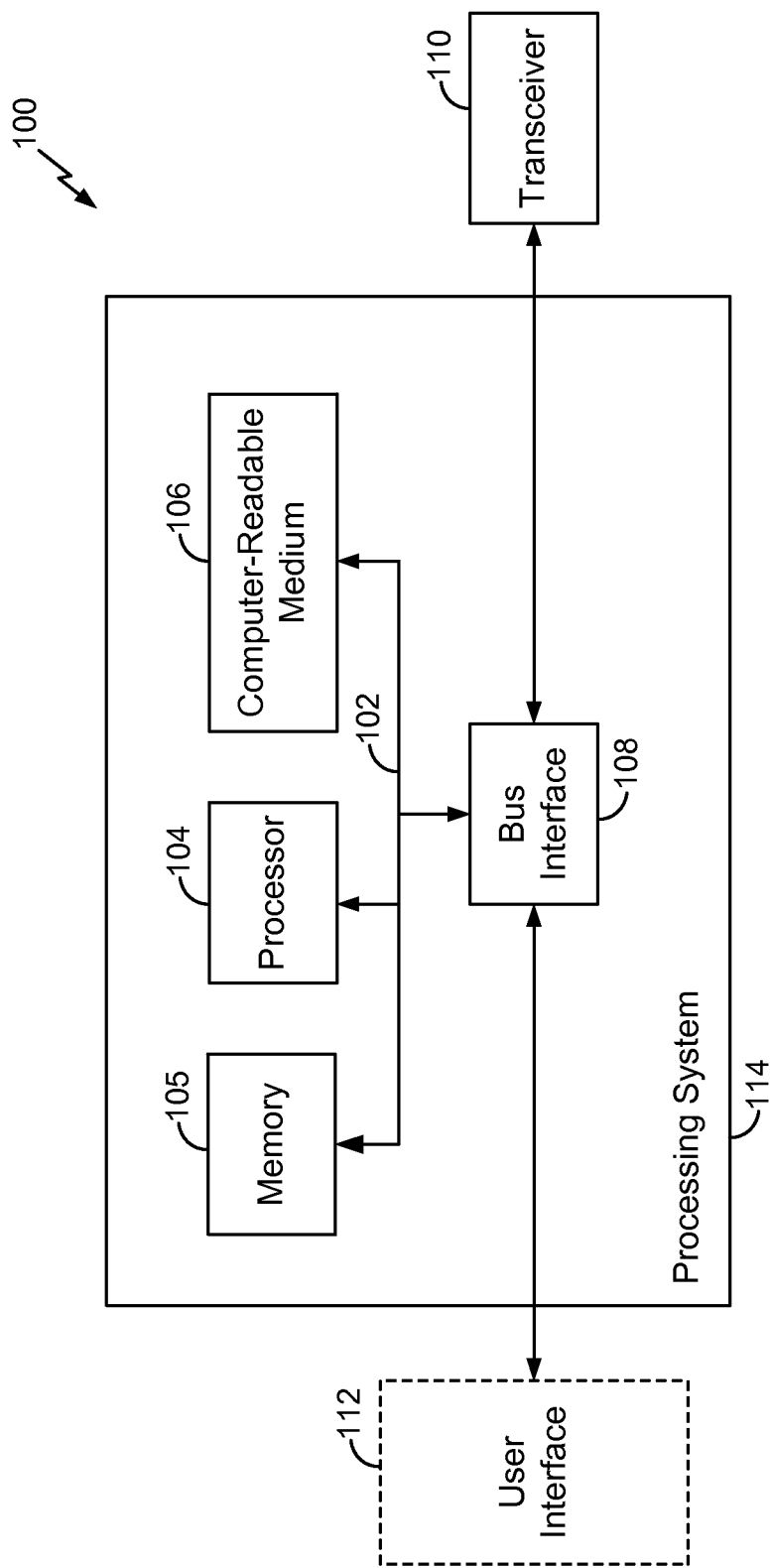
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Here, "medium" may include any media that facilitates transfer of a computer program from one place to another. As an example, the software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
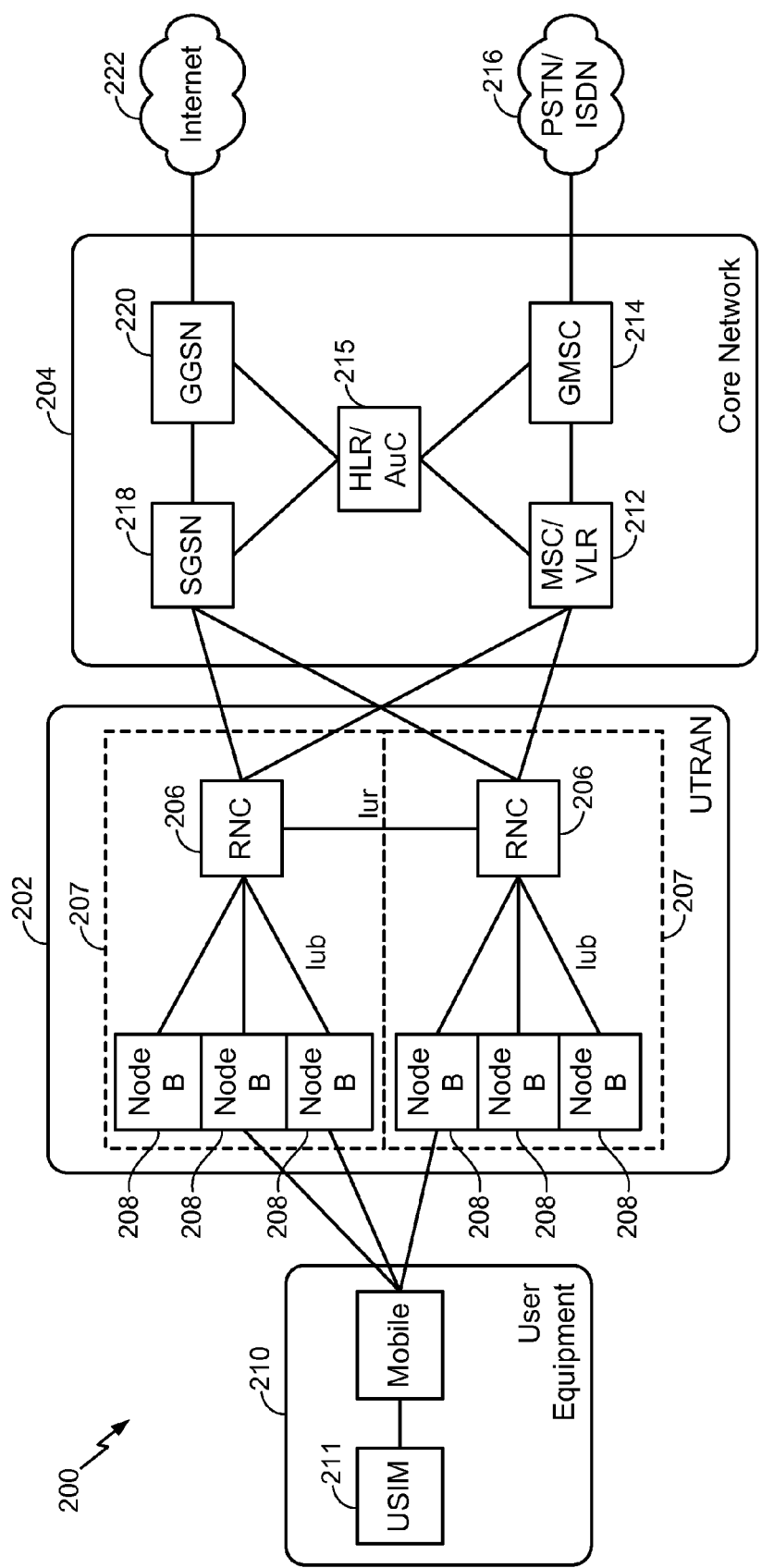
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Communication between the UE 210 and the Node B 208 may be considered as including a physical (PHY) layer and a medium access control (MAC) layer. Further, communication between a UE 210 and an RNC 206 by way of a respective Node B 208 may be considered as including a radio resource control (RRC) layer.

A high speed packet access (HSPA) air interface includes a series of enhancements to the 3 G/W-CDMA air interface, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
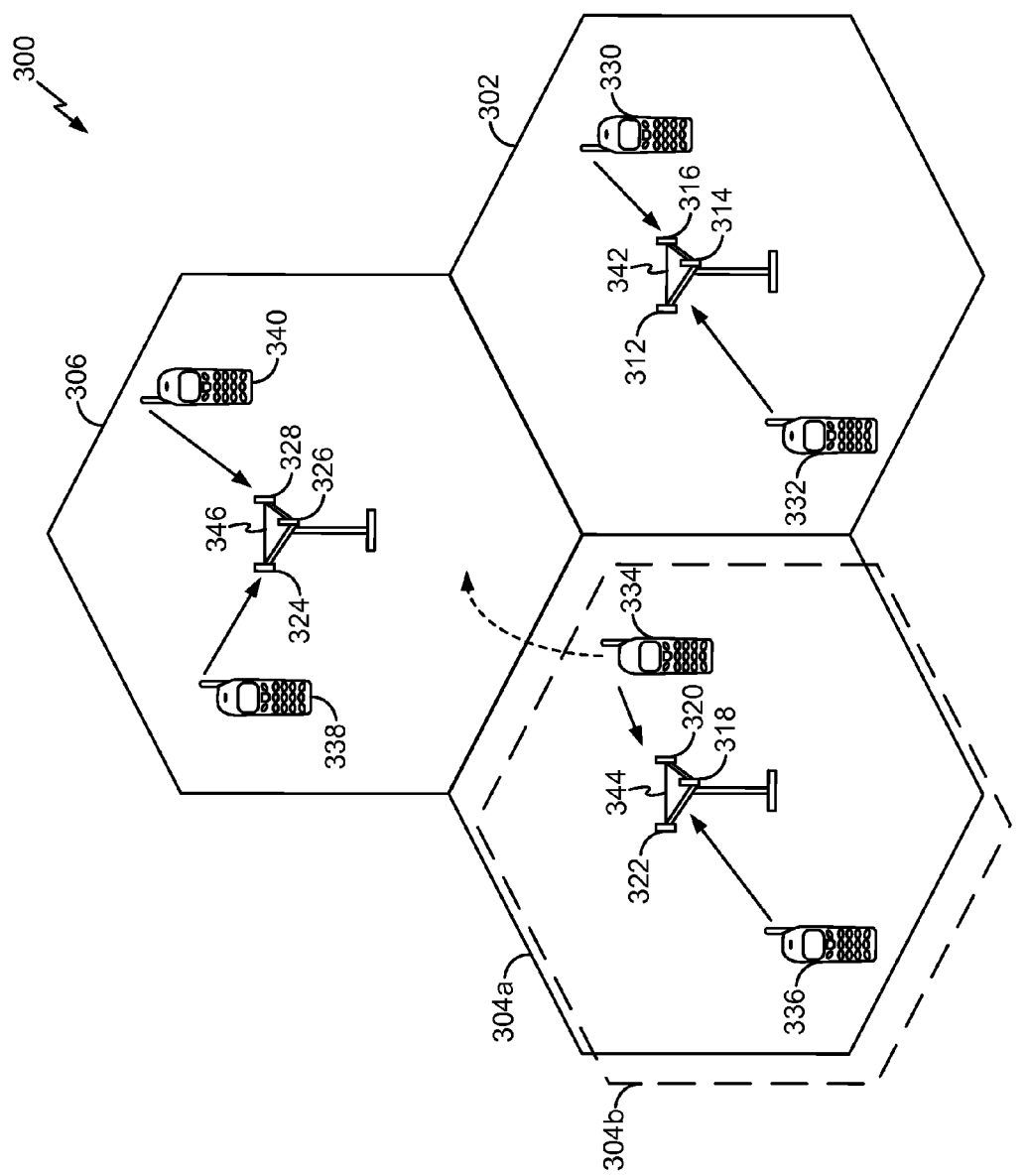
FIG. 3 is a conceptual diagram illustrating an example of an access network.

FIG. 3 illustrates by way of example and without limitation a simplified access network 300 in a UMTS Terrestrial Radio Access Network (UTRAN) architecture, which may utilize HSPA. The system includes multiple cellular regions (cells), including cells 302, 304, and 306, each of which may include one or more sectors. Cells may be defined geographically, e.g., by coverage area, and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

The cells 302, 304 and 306 may include several UEs that may be in communication with one or more sectors of each cell 302, 304 or 306. For example, UEs 330 and 332 may be in communication with Node B 342, UEs 334 and 336 may be in communication with Node B 344, and UEs 338 and 340 may be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

In Release 5 of the 3GPP family of standards, High Speed Downlink Packet Access (HSDPA) was introduced. One difference on the downlink between HSDPA and the previously standardized circuit-switched air-interface is the absence of soft-handover in HSDPA. This means that data is transmitted to the UE from a single cell called the HSDPA serving cell. As the user moves, or as one cell becomes preferable to another, the HSDPA serving cell may change.

In Rel. 5 HSDPA, at any instance a UE has one serving cell. Here, a serving cell is that cell on which the UE is camped. According to mobility procedures defined in Rel. 5 of 3GPP TS 25.331, the Radio Resource Control (RRC) signaling messages for changing the HSPDA serving cell are transmitted from the current HSDPA serving cell (i.e., the source cell), and not the cell that the UE reports as being the stronger cell (i.e., the target cell).

Further, with HSDPA the UE generally monitors and performs measurements of certain parameters of the downlink channel to determine the quality of that channel. Based on these measurements the UE can provide feedback to the Node B on an uplink transmission, such as a channel quality indicator (CQI). Thus, the Node B may provide subsequent packets to the UE on downlink transmissions having a size, coding format, etc., based on the reported CQI from the UE.

During a call with the source cell 304a, or at any other time, the UE 336 may monitor various parameters of the source cell 304a as well as various parameters of neighboring cells such as cells 304b, 306, and 302. Further, depending on the quality of these parameters, the UE 336 may maintain some level of communication with one or more of the neighboring cells. During this time, the UE 336 may maintain an Active Set, that is, a list of cells that the UE 336 is simultaneously connected to (i.e., the UTRA cells that are currently assigning a downlink dedicated physical channel DPCH or fractional downlink dedicated physical channel F-DPCH to the UE 336 may constitute the Active Set).

Release 8 of the 3GPP standards brought dual cell HSDPA (DC-HSDPA), which enables a UE to aggregate dual adjacent 5-MHz downlink carriers. The dual carrier approach provides higher downlink data rates and better efficiency at multicarrier sites. Generally, DC-HSDPA utilizes a primary carrier and a secondary carrier, where the primary carrier provides the channels for downlink data transmission and the channels for uplink data transmission, and the secondary carrier provides a second set of HS-PDSCHs and HS-SCCHs for downlink communication.

Figure 4:
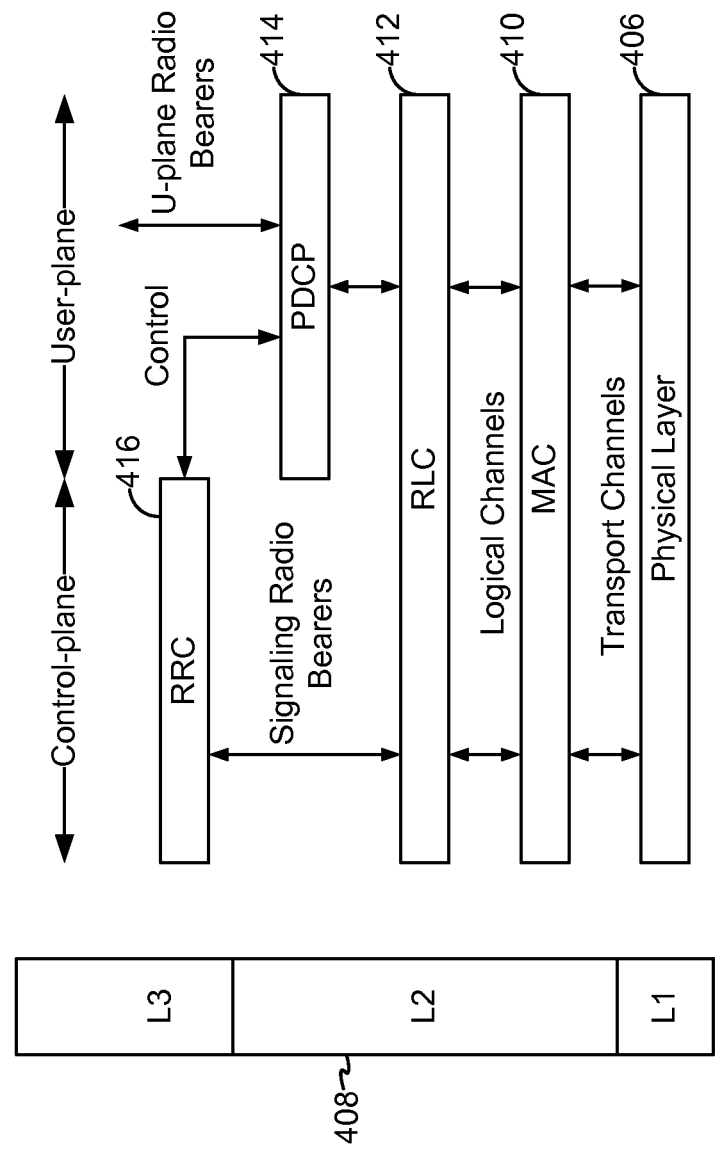
FIG. 4 is a conceptual diagram illustrating an example of a radio protocol architecture for the user and control plane.

The radio protocol architecture between the UE and the UTRAN may take on various forms depending on the particular application. An example for an HSPA system will now be presented with reference to FIG. 4, illustrating an example of the radio protocol architecture for the user and control planes between a UE and a Node B. Here, the user plane or data plane carries user traffic, while the control plane carries control information, i.e., signaling.

Turning to FIG. 4, the radio protocol architecture for the UE and Node B is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 (L2 layer) 408 is above the physical layer 406 and is responsible for the link between the UE and Node B over the physical layer 406.

At Layer 3, the RRC layer 416 handles the control plane signaling between the UE and the Node B. RRC layer 416 includes a number of functional entities for routing higher layer messages, handling broadcast and paging functions, establishing and configuring radio bearers, etc.

In the UTRA air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports acknowledged, unacknowledged, and transparent mode data transfers, and provides segmentation and reassembly of upper layer data packets, retransmission of lost data packets, and reordering of data packets to compensate for out-of-order reception due to a hybrid automatic repeat request (HARQ). That is, the RLC sublayer 412 includes a retransmission mechanism that may request retransmissions of failed packets.

To provide the RLC retransmission mechanism, RLC protocol data units (PDUs) generally include a parameter called a sequence number. The sequence number may take different formats in accordance with whether the UE is in unacknowledged mode or acknowledged mode, but in general, the acknowledged mode PDU is used to coordinate RLC retransmissions. At certain intervals a UE may send an RLC-sublayer PDU called a Status PDU, which may include a field for one or more sequence numbers that were not correctly received, as well as a length indicator indicating the length of a gap where RLC PDUs were not correctly received. Of course, the format of the Status PDU may take other forms, such as including an explicit acknowledgment or negative acknowledgment (ACK/NACK) for each PDU, or any other suitable format. Additional information relating to RLC gaps and retransmissions is provided below.

Here, if the RLC sublayer 412 is unable to deliver the data correctly after a certain maximum number of retransmissions or an expiration of a transmission time, upper layers are notified of this condition and the RLC SDU may be discarded.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations. The MAC sublayer 410 includes various MAC entities, including but not limited to a MAC-d entity and MAC-hs/ehs entity.

Figure 5:
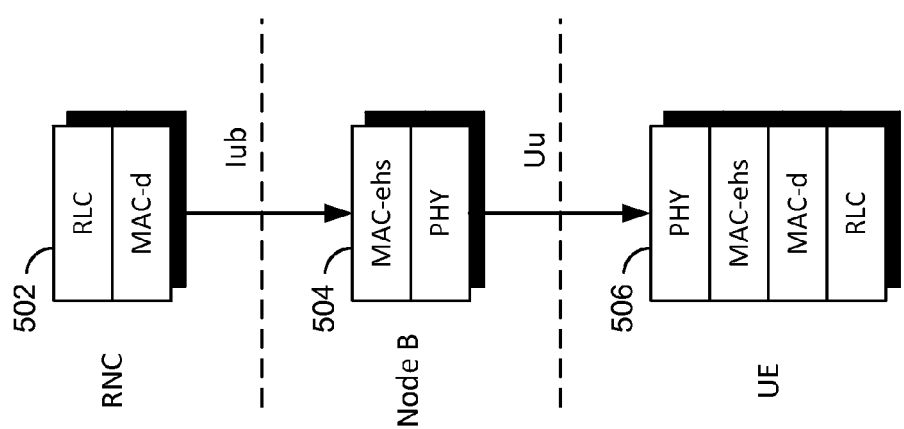
FIG. 5 is a conceptual diagram illustrating some of the layers utilized in a downlink path in an HSDPA network between an RNC and a UE.

FIG. 5 is a schematic illustration of a downlink path in an HSDPA network between an RNC 502 and a UE 506, passing through a Node B 504, showing some of the sublayers at the respective nodes. Here, the RNC 502 may be the same as the RNC 206 illustrated in FIG. 2; the Node B 504 may be the same as the Node B 208 illustrated in FIG. 2; and the UE 506 may be the same as the UE 210 illustrated in FIG. 2. The RNC 502 houses protocol layers from MAC-d and above, including for example the RLC sublayer. For the high speed channels, a MAC-hs/ehs layer is housed in the Node B 504. Further a PHY layer at the Node B 504 provides an air interface for communicating with a PHY layer at the UE 506, e.g., over an HS-DSCH.

From the UE 506 side, a MAC-d entity is configured to control access to all the dedicated transport channels, to a MAC-c/sh/m entity, and to the MAC-hs/ehs entity. Further, from the UE 506 side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

In the present disclosure, the MAC-ehs entity will be described as an illustrative example; however, those skilled in the art will recognize that the MAC-hs entity or any suitable MAC entity may be utilized in accordance with various aspects described herein.

The MAC-ehs entity was standardized with Rel. 7 of the 3GPP family of standards. The MAC-ehs provides support for flexible RLC PDU sizes, and MAC segmentation and reassembly. The MAC-ehs also provides for the multiplexing of data from several priority queues within one TTI.

Figure 6:
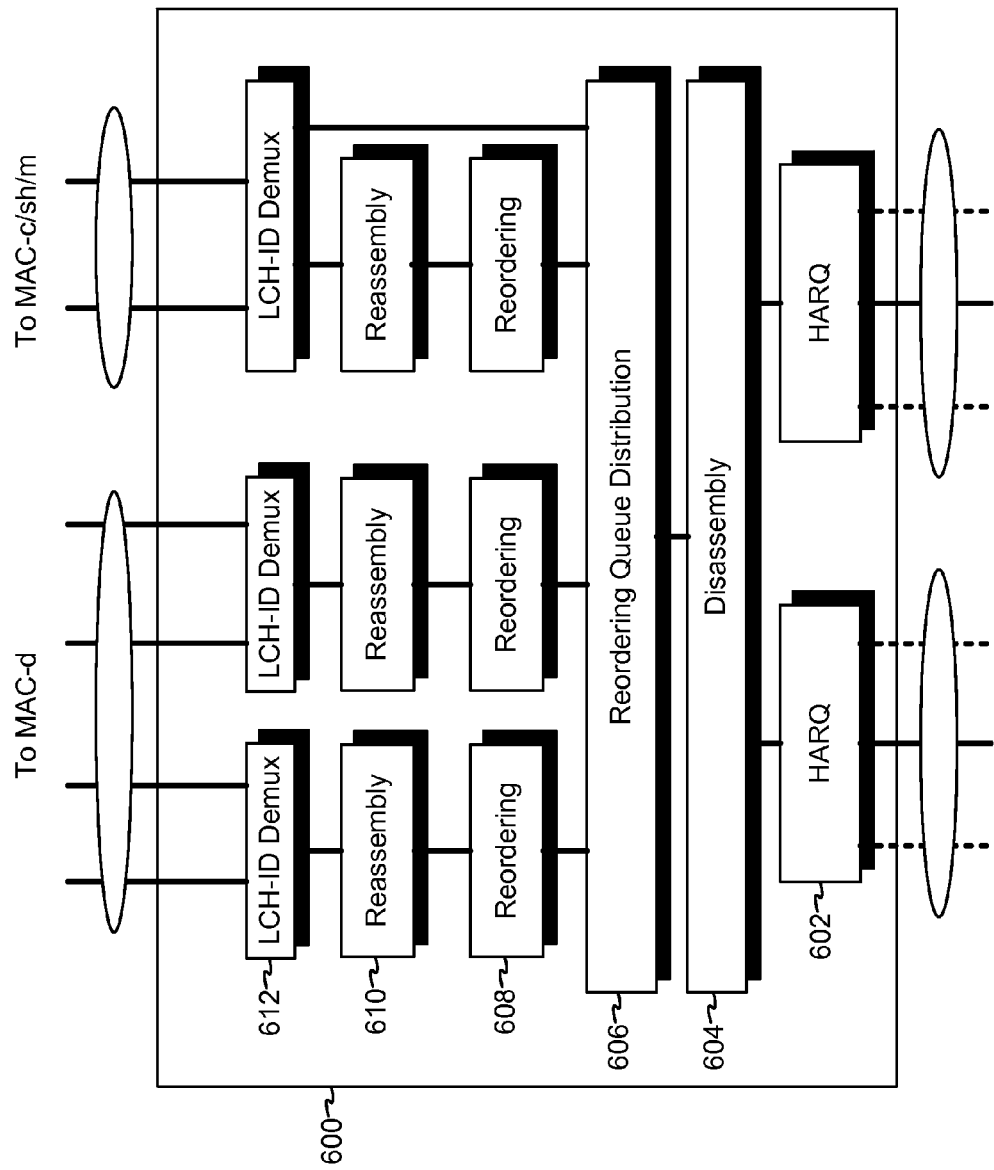
FIG. 6 is a block diagram illustrating some details of a UE-side MAC-ehs entity.

The UE side MAC-ehs entity 600 is illustrated in FIG. 6. The MAC-ehs entity 600 may include a plurality HARQ entities 602, a disassembly entity 604, a re-ordering queue distribution entity 606, and a plurality of re-ordering queues each including a reordering entity 608, a reassembly entity 610, and a LCH-ID demultiplexing entity 612.

There is generally one HARQ entity 602 per HS-DSCH transport channel. The HARQ entity 602 is configured to handle MAC functions and tasks related to the HARQ protocol, such as generating ACKs or NACKs. That is, when the Node B transmits a MAC-ehs PDU having a particular QID to the UE, the UE may respond as to whether it successfully received the PDU by sending an acknowledgment signal, i.e., a HARQ ACK or NACK. If the PDU was not successfully received, i.e., the Node B received a NACK, the Node B may retransmit part of the symbols that make up the original PDU to the UE in an attempt to allow recovery of the PDU. The Node B generally keeps retransmitting these further packets until it receives an ACK or reaches a maximum number of allowed retransmissions. After the maximum number is reached, the Node B generally ceases the retransmissions, discards the PDU, and transmits the next PDU with the next sequential transmission sequence number (TSN) to the UE.

Although the UE unsuccessfully decoded a PDU and sent a NACK, the received but unsuccessfully decoded PDU is generally not discarded by the UE. Rather, when retransmissions are received, the UE combines the first unsuccessfully recovered PDU with the retransmissions and performs error correction to recover the contents of the PDU. With each additional retransmission, the probability of recovering the original PDU may increase.

Further, as shown in FIG. 6, the UE side MAC-ehs has a reordering queue distribution entity 606 configured to route MAC-ehs PDUs to the correct reordering queues based on the received LCH-ID. The reordering entity 608 organizes received reordering PDUs according to the received TSN. Data blocks with consecutive TSNs are then delivered to a reassembly entity 610.

A timer mechanism determines delivery of non-consecutive data blocks to higher layers. There is generally one reordering entity 608 for each priority class.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic.

According to aspects of the present disclosure, another form of aggregation, which may be referred to as soft aggregation, provides for downlink aggregation wherein the respective downlink cells utilize the same frequency carrier. Soft aggregation strives to realize similar gains to DC-HSDPA in a single-carrier network.

Figure 7:
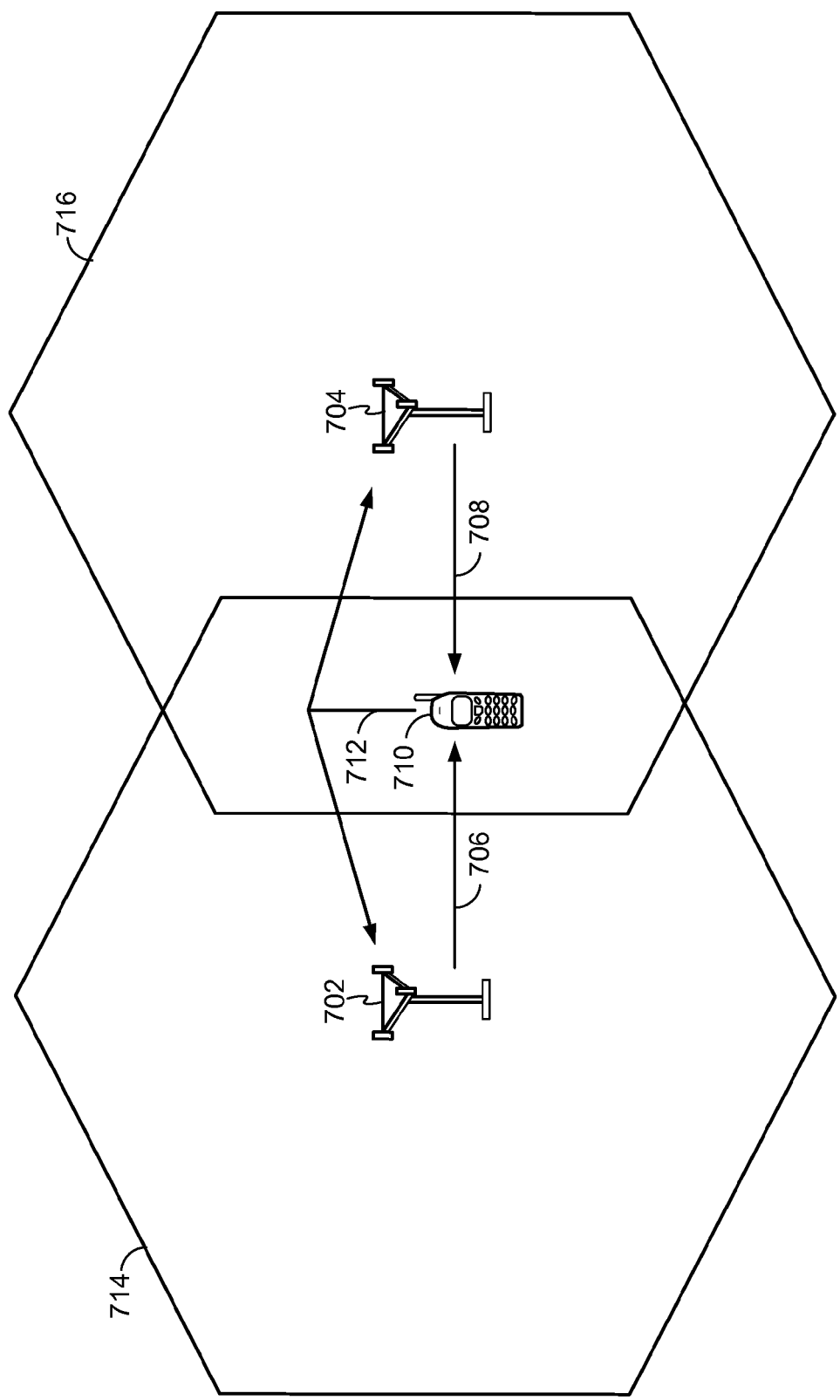
FIG. 7 is a schematic diagram illustrating a portion of a multi-point HSDPA network.

FIG. 7 illustrates an exemplary system for soft aggregation in accordance with some aspects of the present disclosure. In FIG. 7, there may be a geographic overlap between two or more cells 714 and 716, such that a UE 710 may be served, at least for a certain period of time, by the multiple cells. Thus, a wireless telecommunication system in accordance with the present disclosure may provide HSDPA service from a plurality of cells on a single frequency channel, such that a UE may perform aggregation. For example, a setup utilizing two or more cells may be referred to as Single Frequency Dual Cell HSDPA (SFDC-HSDPA), Coordinated Multi-Point HSDPA (CoMP HSDPA), or simply Multi-Point HSDPA. However, other terminology may freely be utilized. In this way, users at cell boundaries, as well as the overall system, may benefit from a high throughput. Here, the different cells may be provided by the same Node B, or the different cells may be provided by disparate Node Bs.

In the scheme illustrated in FIG. 7, two Node Bs 702 and 704 each provide a downlink cell 706 and 708, respectively, wherein the downlink cells are in substantially the same carrier frequency. Of course, as already described, in another aspect, both downlink cells 706 and 708 may be provided from different sectors of the same Node B. Here, the UE 710 receives and aggregates the downlink cells and provides an uplink channel 712, which is received by both Node Bs 702 and 704. The uplink channel 712 from the UE 710 may provide feedback information, e.g., corresponding to the downlink channel state for the corresponding downlink cells 706 and 708.

A DC-HSDPA-capable UE has two receive chains, each of which may be used to receive HS data from a different carrier. In a Multi-Point HSDPA-capable UE, if the plural receive chains are made to receive HS data from different cells, at least some the benefits from aggregation can be realized in a single-carrier network.

In some aspects of the present disclosure, the cells being aggregated may be restricted to cells in the UE's Active Set. These cells may be the strongest cells in the Active Set, determined in accordance with the downlink channel quality. If the strongest cells reside in different Node B sites, this scheme may be called 'soft aggregation'. If the strongest cells to be aggregated reside in the same Node B site, this scheme may be called 'softer aggregation.'

Softer aggregation is relatively straightforward to evaluate and implement. However, since the percentage of UEs in softer handover may be limited, the gain from softer aggregation may correspondingly be limited as well. Soft aggregation has the potential to offer much greater benefit. However, there are concerns related to uplink overhead channel performance and out-of-order delivery.

In a conventional DC-HSDPA or Multi-Point HSDPA system wherein both cells are provided by a single Node B (i.e., softer aggregation), the two cells may share the same MAC-ehs entity in much the same way as the conventional HSDPA system illustrated in FIG. 5. Here, because the downlink data comes to the UE from a single Node B site, the RLC entity at the UE may generally assume that the packets are sent in order in accordance with their respective RLC sequence numbers. Thus, any gap in sequence numbers in received packets can be understood to be caused by a packet failure, and the RLC entity at the RNC may simply retransmit all packets corresponding to the missing sequence numbers.

The RLC layer in the UE generally makes sure that any physical layer losses are not felt by the upper layer. The MAC at the UE cannot generally guarantee in-order delivery of data packets from multiple cells, because (as described above) various issues may occur at a subset of the cells providing the downlink channels, and HARQ retransmissions at the MAC layer may result in out-of-order packets. Thus, the RLC sublayer puts the received packets in order.

Figure 8:
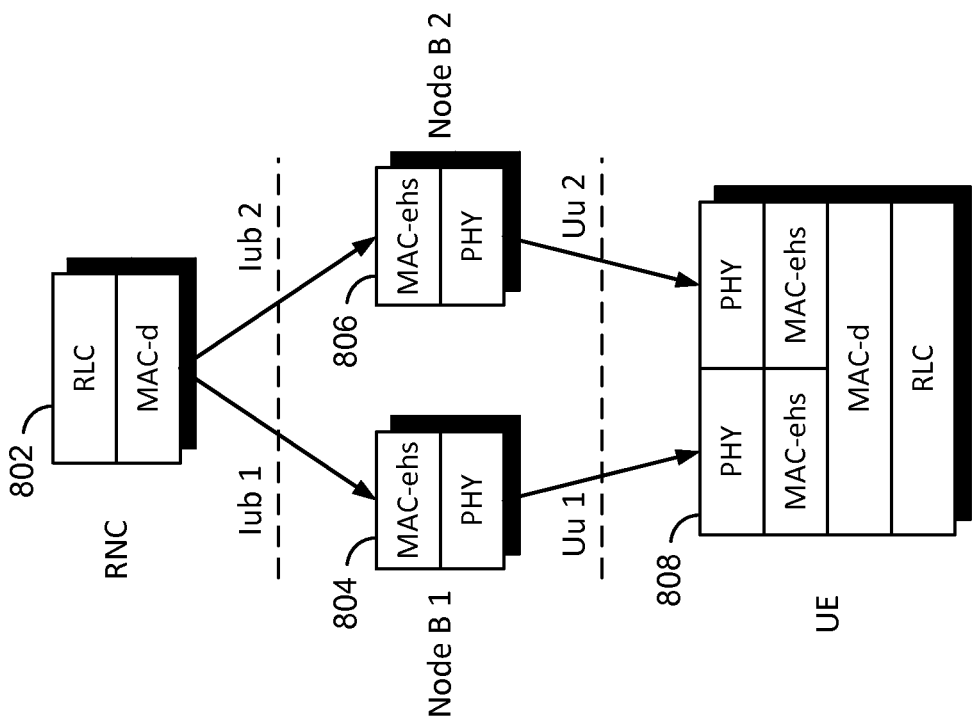
FIG. 8 is a conceptual diagram illustrating some of the layers utilized in a downlink path in a multi-point HSDPA network between an RNC having a multi-link RLC layer and a UE.

In an aspect of the present disclosure, as illustrated in FIG. 8, an RNC 802 may include a multi-link RLC sublayer that provides packets to a plurality of Node Bs 804 and 806, which each provide downlink HS-transmissions to a UE 808. Thus, the UE may be enabled for downlink aggregation, e.g., Multi-Point HSDPA. Here, the UE 808 may include a plurality of MAC entities, each of the plurality of MAC entities corresponding to a different serving cell (e.g., a primary serving cell and a secondary serving cell) from corresponding Node B sites. For example, one MAC entity in the UE 808 may correspond to the first Node B 804 providing a primary serving cell, and a second MAC entity in the UE 808 may correspond to the second Node B 806 providing a secondary serving cell. Of course, for various reasons, the pairing of a particular MAC entity with a particular Node B may change over time, and the illustration is only one possible example.

Thus, the RNC 802 may include a multi-link RLC sublayer, wherein a flow control algorithm allocates packets for the UE 808 among the plurality of cells (e.g., at Node Bs 804 and 806) utilizing a plurality of RLC links, e.g., over Iub interfaces.

As described below, with reference to FIG. 9, certain issues may arise with such a multi-link RLC, particularly relating to out-of-order delivery of packets to the dual MAC entities at the UE from the dual cells, which may potentially result in unnecessary retransmissions. Aspects of the present disclosure may address these issues with a multi-link RLC algorithm that takes into account the particular issues of this setup to reduce or eliminate these unnecessary retransmissions.

Figure 9:
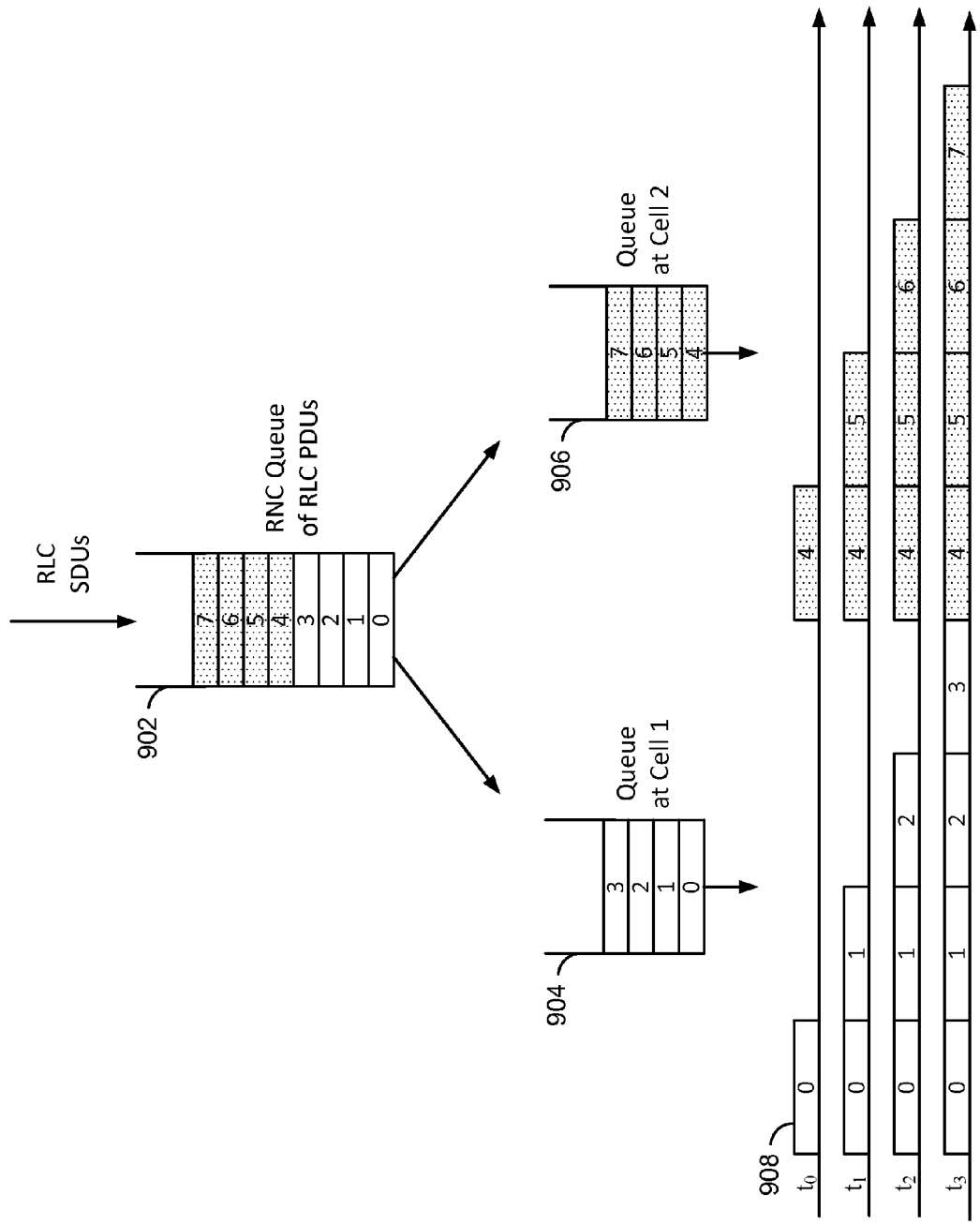
FIG. 9 is a conceptual diagram illustrating a flow of RLC PDUs on a downlink path from an RNC having a multi-link RLC layer and a UE.

FIG. 9 is a schematic illustration of the flow of eight packets from a serving RNC 902 having a multi-link RLC, through a pair of Node Bs 904 and 906, converging at a UE 908. In the illustrated example, 8 RLC PDUs are shown, labeled 0-7. Here, the SRNC 902 receives eight RLC SDUs from higher layers to be sent as RLC PDUs to the UE 908. For the purpose of simple explanation, a flow control algorithm at the SRNC 902 allocates the first four packets 0-3 to the first Node B 904, and the second four packets 4-7 to the second Node B 906. Of course, in various aspects of the present disclosure any suitable flow control algorithm may be utilized to forward the packets to the respective Node Bs, and the simple illustrated division among the two Node Bs is only utilized for ease of explanation.

At the first Node B 904, a queue prepares to send its packets 0-3 to the UE 908, and at the second Node B 906, a queue prepares to send its packets 4-7 to the UE 908. Assuming that the channel conditions at each Node B are equivalent, and that cell loading is also equivalent, then at time $t_0$, the UE 908 receives the first packet from each Node B, that is, packets 0 and 4. In the illustrated example, a first MAC entity at the UE receives packet 0, and a second MAC entity at the UE receives packet 4.

At this time, the UE 908 may generate a feedback to be sent on an uplink transmission to communicate any gap or gaps in the received packets. Here, the feedback may take any suitable format, including but not limited to an element called LIST or RLIST, a cumulative ACK to indicate that all packets up to a particular sequence number are to be considered acknowledged, or a Status PDU. Here, the Status PDU may be utilized to communicate information relating to received packets and/or missing packets (e.g., gaps). Various formats for the Status PDU may be utilized in accordance with aspects of the present disclosure. In one example, a Status PDU may include an indication of the sequence number (SN) of the first missing PDU in a gap, and an indication of the length or number of packets in the gap. In another example, a Status PDU may include the highest SN of the packets that are received. In yet another example, a Status PDU may enumerate each SN corresponding to missing packets, or each SN corresponding to received packets. Some examples may utilize an RLC STATUS PDU as described in the RLC Protocol Specification, 3GPP TS 25.322, sections 11.5 and 11.6, incorporated by reference herein. That is, in accordance with some aspects of the present disclosure utilizing Multi-Point HSDPA, the feedback from the UE may be the same as for a legacy UE equipped for HSDPA or DC-HSDPA.

In some aspects of the disclosure, the UE may send the Status PDU when it is triggered. Here, the triggering algorithm for the UE in Multi-Point HSDPA may be the same as that for a legacy UE. That is, the UE may send the Status PDU periodically, or in response to a poll. Of course, in various aspects of the present disclosure, the UE may send the Status PDU at any suitable time.

Returning now to FIG. 9, at time $t_0$, the last received sequence number corresponds to packet 4, but packets 1, 2, and 3 have not yet been received. At this time, the UE may generate and send a Status PDU that may indicate a gap in sequence numbers corresponding to packets 1, 2, and 3. However, in reality this gap is not caused by packets that were lost or corrupted during transmission. That is, the gap is caused by skew, due to the Multi-link RLC scheme utilizing dual cells for the downlink transmission. That is, the gap in this instance is due to skew rather than a packet failure. At time $t_1$, cell 1 provides packet 1 and cell 2 provides packet 5. Again, if feedback is provided by the UE at time $t_1$, the feedback may indicate a gap corresponding to packets 2 and 3, but once again this gap is caused by skew rather than a packet failure. In the illustrated example, it is not until time $t_3$ that all the packets are received from cell 1, and no gap exists.

In some aspects of the present disclosure, a "gap" may include one or more packets corresponding to one or more sequence numbers. Further, there may be more than one gap corresponding to a particular MAC entity that forwards packets to the UE. Here, some of the gaps may be caused by skew, while some of the gaps may be caused by failures.

On the other hand, if there is a sequence number gap, but no subsequent successful packets were received from that same MAC entity, then the RNC cannot be sure that the gap corresponds to a packet failure. The gap may be filled naturally, and it may just be due to out-of-order packets. Thus, in an aspect of the present disclosure, the process may designate the gap as being caused by skew.

In addition to skew caused by out-of-order packets, resulting from the allocation of packets to disparate Node Bs, skew may be caused when the time it takes for a packet to pass through one Node B is longer or shorter than the time it takes for a packet to pass through the other Node B. That is, congestion at one Node B may contribute to skew, without necessarily leading to a packet loss or failure. In this instance, unnecessary retransmissions may be requested.

Various aspects of the present disclosure provide for a multi-link RLC sublayer at the RNC that is capable of distinguishing between gaps caused by skew, as described above, and gaps caused by genuine physical layer erasures or transmission failures. In this way, the unnecessary retransmissions of packets corresponding to gaps caused by skew may be reduced or eliminated.

In one example, the RLC transmitter at the RNC may keep track of the sending path of each RLC PDU so that it may know the successful packet with largest RLC sequence number at each cell. To do so, the RNC may maintain a mapping between each RLC packet and the Node B queue this RLC packet is sent to. This mapping may further include an indication as to whether the transmission is a first-time transmission or a retransmission. With this map, the RLC transmitter may be able to distinguish between the flow control skew and physical layer erasures.

In some aspects of the present disclosure, the intelligence for determining whether to retransmit packets corresponding to sequence number gaps may be contained within the RNC. That is, the RLC entity in the UE may not require knowledge of which cell sent a particular packet, and the feedback from the UE need not include any new information relative to the feedback provided in a conventional system. Therefore, few if any changes to the UE may be required relative to conventional systems.

Figure 10:
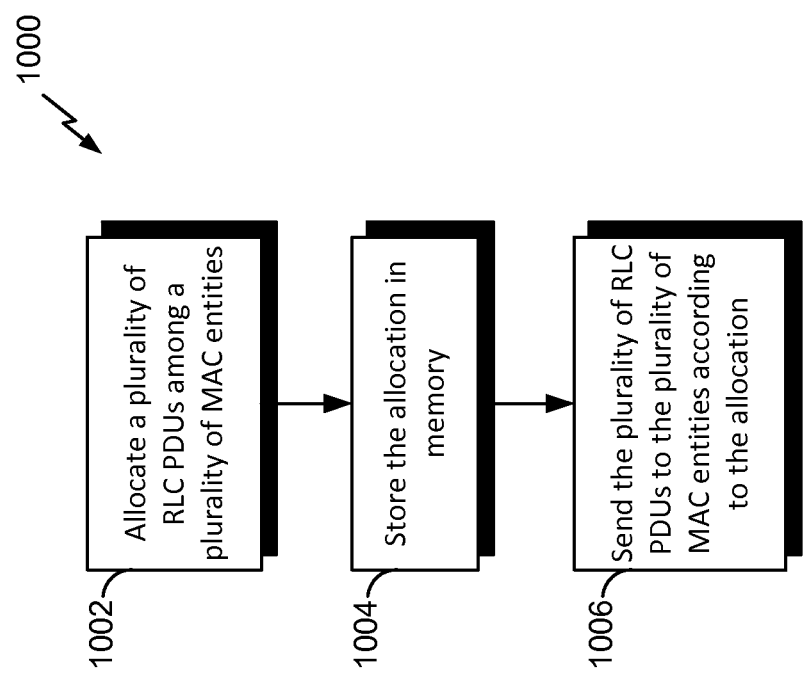
FIG. 10 is a flow chart illustrating an exemplary process of allocating and sending RLC PDUs from a multi-link RLC.

FIG. 10 is a flow chart illustrating an exemplary process for wireless communication in accordance with some of the aspects of the present disclosure. In some examples, the process 1000 may be performed by an RNC 206 (see FIG. 2), an RNC 802 (see FIG. 8), or any suitable network node implementing an allocation of packets (e.g., RLC PDUs) for a UE to a plurality of cells. Further, the process 1000 may be implemented by a processor 104 configured to perform the below-recited functions. In one non-limiting example described below, the process may be implemented at an RLC sublayer of an RNC configured to provide packets for a Multi-Point HSDPA wireless communication system.

In block 1002, the process may allocate a plurality of packets such as RLC PDUs, among a plurality of MAC entities. The plurality of MAC entities may correspond to a plurality of base stations or Node Bs, wherein each Node B may utilize a suitable MAC entity. The MAC entity may be a MAC-ehs entity, a MAC-hs entity, or any suitable MAC entity in accordance with the particulars of a specific implementation. Here, a suitable flow control algorithm at an RNC 802 may be utilized to determine the allocation of packets among the plurality of MAC entities, and may take various factors into account, including but not limited to channel conditions and loading conditions at each Node B.

In block 1004, the process may store the allocation of the plurality of packets in a memory, e.g., the memory 105 (see FIG. 1). For example, the allocation may be written to a storage space such as any suitable non-random aggregation of data, irrespective of its mode of storage or presentation. Here, the storing of the allocation may include storing an identifier of a particular MAC entity or Node B corresponding to each sequence number of each packet sent to the respective MAC entity. In other examples, the storing of the allocation may take any suitable format in the memory, such that the RNC may be enabled to identify to which MAC entity a packet was allocated.

In block 1006, the process may send the allocated packets to the plurality of MAC entities according to the allocation. Here, the allocated packets may be transmitted from the RNC 802 to the respective Node Bs 804, 806 that include the corresponding MAC entities, over the Iub interfaces or any other suitable communication interface between the RNC 802 and the Node Bs 804, 806.

In some examples, the process 1000 may repeat at any suitable interval, e.g., being periodic or intermittent. The allocation, storing, and sending of the packets may generally correspond to an amount of traffic directed to a particular UE, and may occur in bursts when traffic is directed to the UE. In some examples, a flow control algorithm may allocate relatively small sets of packets to the respective MAC entities, so that feedback corresponding to a previous set of packets may be utilized in following allocations of packets in a timely fashion.

Following the sending of the packets to the respective MAC entities, the packets are transmitted by the corresponding Node Bs on suitable downlink channels to the UE. For example, referring once again to FIG. 7, downlink channels 706 and 708 may provide dual HS-DCCHs to the UE 710 over the same carrier frequency in a Multi-Link HSDPA system. The UE may then provide feedback as described above over an uplink transmission 712 to the Node Bs 702 and 704. The feedback may include RLC Status PDUs, which may thereby be provided over the Iub interface to the RNC (see, e.g., FIG. 2).

Figure 11:
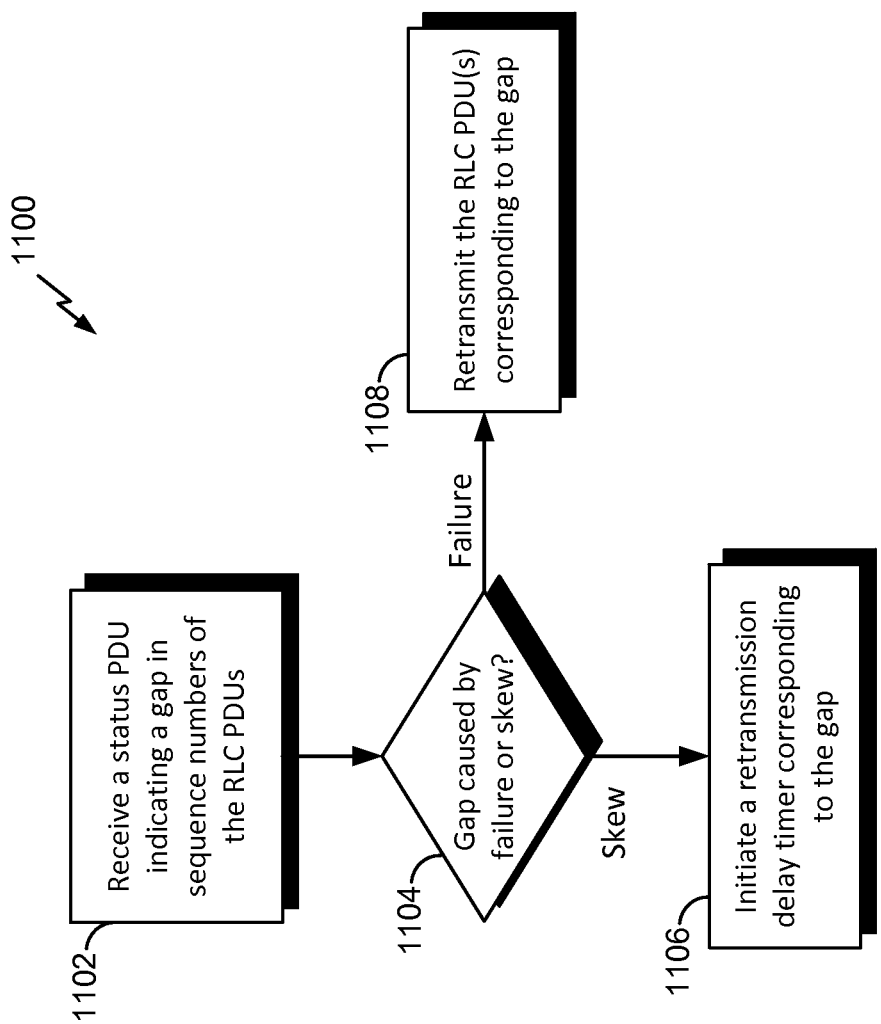
FIG. 11 is a flow chart illustrating an exemplary process of handling a Status PDU received from a UE at a multi-link RLC sublayer of an RNC.

FIG. 11 is a flow chart illustrating a further aspect of an exemplary process for wireless communication in accordance with the present disclosure. In some examples, the process 1100 may be performed by an RNC 206 (see FIG. 2), an RNC 802 (see FIG. 8), or any suitable network node implementing an allocation of packets (e.g., RLC PDUs) for a UE to a plurality of cells. Further, the process 1100 may be implemented by a processor 104 configured to perform the below-recited functions. In one non-limiting example described below, the process may be implemented at an RLC sublayer of an RNC configured to provide packets for a Multi-Point HSDPA wireless communication system.

In block 1102, the process may receive a packet, e.g., an RLC Status PDU. The Status PDU may be received over the Iub interface from the Node B, which in turn may have received the packet as feedback information on an uplink transmission from the UE (see FIG. 2), e.g., being carried on a HS-DPCCH transmission. As discussed above, the Status PDU may include information relating to one or more gap(s) in sequence numbers of packets received at the UE.

Figure 12:
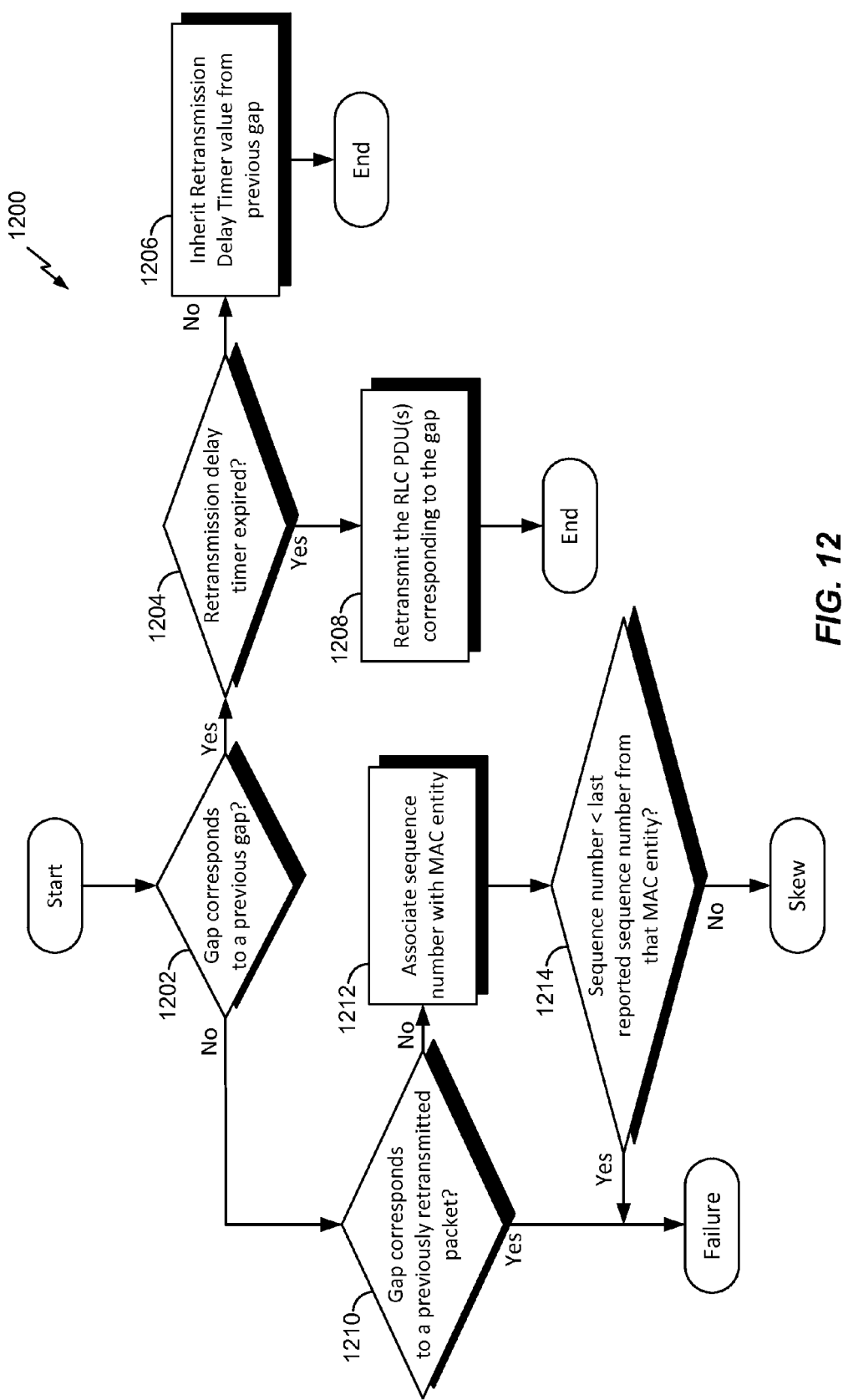
FIG. 12 is a flow chart illustrating an exemplary process of determining whether a reported sequence number gap corresponds to a physical layer transmission failure or skew.

In block 1104, the process may determine whether the gap reported by the UE is caused by a physical layer transmission failure, or by a skew. FIG. 12 (discussed in further detail below) provides additional information on how the determination may be made.

If in block 1104 the process determines that the gap is caused by a physical layer transmission failure, the process may proceed to block 1108, wherein the process may retransmit the packet(s) corresponding to the gap.

RLC retransmissions are described in detail in the RLC protocol specification, 3GPP TS 25.322, which is publically available. For example, when an RLC PDU is sent towards a UE, that packet may be stored in a retransmission buffer. Later, packets stored in the retransmission buffer may be deleted or retransmitted to the UE based on the Status PDU provided by the UE. This Status PDU may include positive or negative acknowledgments of individual packets received by the UE.

In various aspects of the present disclosure, the retransmitted packets may be forwarded to either Node B queue based on the flow control being utilized in a particular implementation. That is, in general, retransmitted packets may be sent to the same Node B as used in the original transmission or a different Node B than the one used in the original transmission.

If in block 1104 the process determines that the gap is caused by skew, the process may proceed to block 1106, wherein the process may initiate a retransmission delay timer corresponding to the gap. The retransmission delay timer may be utilized to initiate a retransmission at a later time if and when the data corresponding to the gap is not received. That is, in some aspects of the disclosure the determination of skew may not necessarily be certain, and a retransmission may be desired if the gap is not resolved after a certain period of time. Referring again to FIG. 9, a gap may be determined to be caused by skew, e.g., at time $t_0$, when packets 0 and 4 are received, and the gap exists between packets 0 and 4. Here, a retransmission delay timer may be started as in block 1106. Moving forward, the gap between packets 0 and 4 may remain for a long period of time. For example, over time, all the packets 4-7 may be received from cell 2, while some delay or packet loss may cause the packets after packet 0 to fail to be received from the cell 1. In this case, although it may initially appear that the delay is caused by skew, a retransmission of the packets corresponding to the gap may be desired. As described above, the retransmission may be sent from the same cell or from a different cell if the RNC decides that a retransmission through the same cell may be unsuccessful.

Here, the value of the retransmission delay timer may be selected to be sufficiently large to keep the number of spurious retransmissions small. That is, if the retransmission delay timer expires too quickly, then retransmissions may be sent although the packet corresponding to the gap would have been received in an acceptable amount of time. Further, the value of the retransmission delay timer may be selected to be sufficiently small not to cause undesirably long interruptions when one of the serving cells experiences a relatively long delay or disruption, e.g., due to a deep fade, slow fading, or a loading increase. However, in accordance with various aspects of the present disclosure, any suitable value may be chosen for the retransmission delay timer.

In some aspects of the present disclosure, the retransmission delay timer may be an internal timer configured to measure time in accordance with a clock, a crystal, an oscillator, or another suitable timing mechanism in a processing system (e.g., at the processor 104 illustrated in FIG. 1). Further, the retransmission delay timer may be an external timer within the RNC or accessible by the RNC. Those skilled in the art will comprehend that any suitable timer mechanism may be utilized.

FIG. 12 is a flow chart illustrating an exemplary process for determining whether a sequence number gap is caused by a physical layer transmission failure or skew, in accordance with some aspects of the present disclosure. Here, the process 1200 may correspond to block 1104 illustrated in FIG. 11, for determining whether the gap is caused by physical layer transmission failure or skew.

In block 1202, the process may determine whether the gap reported by the UE corresponds to a previous gap with a running retransmission delay timer. That is, returning again to FIG. 9, it may be the case that the UE provides a Status PDU at each of times $t_0$, $t_1$, $t_2$, $t_3$, and $t_4$, or at some subset of these times. At time $t_0$, the UE may provide a Status PDU reporting a gap corresponding to packets 1, 2, and 3, with the largest received sequence number being 4. In response, the RNC may determine that the gap is caused by skew, and may initiate a retransmission delay timer, as discussed above with relation to FIG. 11. Further, at time $t_1$, the UE may provide a Status PDU reporting a gap corresponding to packets 2 and 3, with the last received sequence number being 5. Here, the reported gap at time $t_1$ corresponds to the gap previously reported in the Status PDU sent at time $t_0$, because at least a portion of the gap at time $t_1$ is caused by the same skew or out-of-order allocation of packets among the plural cells as the gap at time $t_0$. That is, at least one of the sequence numbers corresponding to the gap reported at time $t_1$ is the same as at least one of the sequence numbers corresponding to the gap reported at time $t_0$. Here, as discussed with reference to FIG. 11, at block 1106, a retransmission delay timer corresponding to the gap may have been started in response to the determination that the gap at time $t_0$ is caused by skew. Thus, because the gap reported by the UE at time $t_1$ corresponds to a previous gap at time $t_0$, the process may proceed to block 1204, wherein the process may determine whether the retransmission delay timer corresponding to the gap has expired.

If, in block 1204, the process determines that the retransmission delay timer has not yet expired, then the process may proceed to block 1206, in which the "new" gap, i.e., the gap reported at time $t_1$, may inherit the retransmission delay timer value corresponding to the previous gap, i.e., the gap reported at time $t_0$. That is, because the gap reported at time $t_1$ is not actually a new gap, but is the remaining portion of the previous gap reported at time $t_0$, a new retransmission delay timer may not be started and instead the gap may inherit the previous retransmission delay timer value. This way, the retransmission delay timer may continue running, after having been started in accordance with the gap reported at time $t_0$. Here, inheritance of the value of the retransmission delay timer may include updating an association between a gap and a retransmission delay timer in a table, or simply allowing the existing association between the previous gap and the retransmission delay timer to remain unchanged, in accordance with the details of a specific implementation of the retransmission delay timer.

On the other hand, if in block 1204 the process determines that the retransmission delay timer has expired, then the process may proceed to block 1208, wherein the process may retransmit the packet or packets having the sequence number or numbers corresponding to the gap, as described above. That is, the retransmission in block 1208 may include substantially the same aspects as the retransmission described above with relation to block 1108 in FIG. 11.

In some aspects of the present disclosure, the determination in block 1204 of whether the retransmission delay timer has expired may be implemented in line, as illustrated. In other aspects of the present disclosure, the expiration of the retransmission delay timer may trigger an interrupt routine wherein the packet or packets having the sequence number or numbers corresponding to the gap may be retransmitted, separate from the remainder of the procedure illustrated in FIG. 12.

Returning to block 1202, if the process determines that the gap does not correspond to a previous gap, the process may proceed to block 1210, wherein the process may determine whether a packet having a sequence number corresponding to the gap reported by the UE has been previously retransmitted. That is, if the packet has been previously retransmitted, then a new Status PDU indicating the same gap can be assumed to be caused by a failure and not skew. In this case, the gap may be determined to be caused by failure. Here, returning to FIG. 11, the packet corresponding to the gap may be retransmitted again, as described with relation to block 1108. In some examples in accordance with aspects of the present disclosure, these retransmissions may occur up to a maximum number of retransmissions, after which the RLC sublayer may determine to discard the packet.

Similarly, for data that are retransmitted after the expiration of the retransmission delay timer as described above with relation to block 1208, if a subsequent Status PDU reports a gap corresponding to the same packet or packets, the next retransmission may be sent immediately. Namely, the loss for the retransmitted skew data may be considered to be genuine loss because a Status Prohibit Timer may be long enough to suppress a repetitive negative acknowledgment for the same gap. To achieve this, the RNC may store whether each retransmitted packet is due to an expiration of the retransmission delay timer expiration.

In block 1210, if the process determines that the gap does not correspond to a previously retransmitted packet, the process may proceed to block 1212, wherein the process may associate each sequence number corresponding to the gap, with the MAC entity from which the corresponding packet was sent. In various aspects of the disclosure, this association may be made in accordance with a packet-cell mapping stored in a memory at (or at a location accessible by) the RNC. For example, returning to FIG. 10, in one aspect of the disclosure, the RNC may store the allocation of packets among a plurality of MAC entities in a memory. Here, in block 1212, the RNC may determine, in accordance with the stored allocation, a corresponding MAC entity to which the packet was allocated. As one example, the sequence number corresponding to the gap may be compared to a stored reference table containing an indexed mapping of sequence numbers and a corresponding MAC entity identifier.

In block 1214, the process may compare the sequence number corresponding to the gap, with the last reported sequence number acknowledged by the UE for the corresponding MAC entity. If, from the same cell, subsequent packets were successful, then the RNC may know that that the sequence number gap corresponds to a packet failure.

Depending on the format of the Status PDU from the UE, the Status PDU may include a last sequence number corresponding to the last packet received at the UE. However, this last reported sequence number may not be the same as the last sequence number for the corresponding MAC entity. For example, referring again to FIG. 9, at time $t_0$, the UE may have provided a Status PDU indicating the last sequence number being 4. However, the sequence numbers corresponding to the gap, i.e., 1, 2, and 3, are associated with a different MAC entity than the one associated with packet 4. That is, packets 1, 2, and 2 were transmitted by a different cell than packet 4. Here, the last sequence number acknowledged for the MAC entity corresponding to the reported gap is 0. Thus, in this example the sequence number(s) corresponding to the gap are greater than the last sequence number acknowledged for the corresponding MAC entity.

Thus, in accordance with some aspects of the present disclosure, a gap corresponding to a sequence number that is less than the last sequence number acknowledged for that cell may be considered a genuine physical layer transmission failure.

Figure 13:
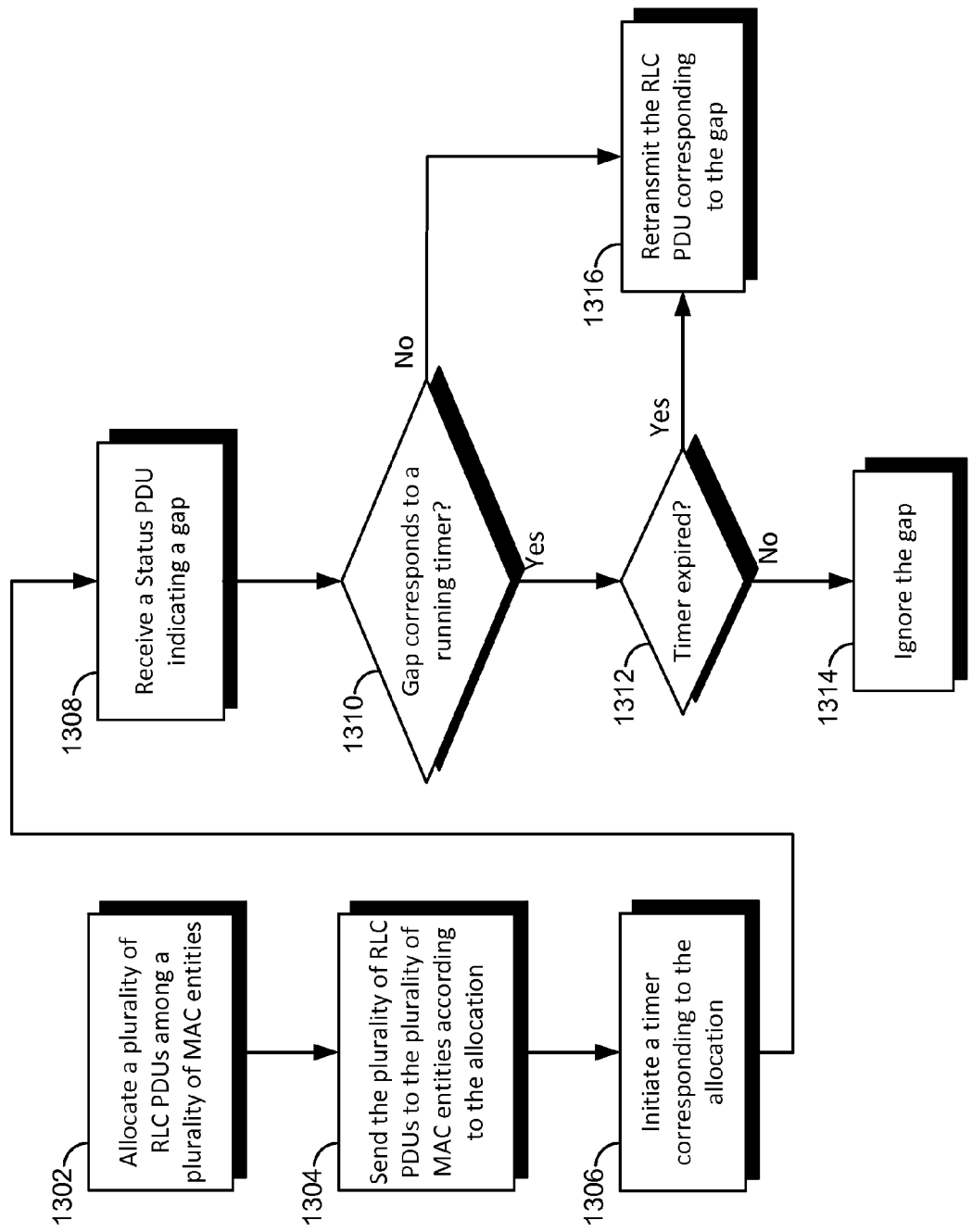
FIG. 13 is a flow chart illustrating an exemplary process of allocating and sending RLC PDUs from a multi-link RLC, and handling a Status PDU received from a UE.

FIG. 13 illustrates another exemplary process in accordance with some aspects of the present disclosure.

(modules) a multi-link RLC entity which may be located at a RNC, as illustrated in FIG. 8.

Here, the process may utilize a timer at (or at a location accessible by) the RNC for determining whether a gap corresponds to a physical layer transmission failure or skew. That is, in this example, the RNC may ignore Status PDUs provided by the UE that indicate a gap that corresponds to a previous gap for which the timer is running For example, in block 1302, the process may allocate from a multi-link RLC entity, such as the RLC sublayer at a RNC, a plurality of packets such as RLC PDUs among a plurality of MAC entities. Here, the MAC entities may be MAC-ehs or MAC-hs entities in accordance with various aspects of the present disclosure. Further, the MAC entities may be located at disparate Node Bs in the case of soft aggregation, or at the same Node B in the case of softer aggregation, in accordance with various aspects of the present disclosure. In block 1304, the process may send the plurality of RLC PDUs to the plurality of MAC entities according to the allocation. For example, the RLC entity at the RNC may provide the RLC PDUs to the MAC-d entity at the RNC, which may then provide the packets to MAC-ehs entities at respective Node Bs over Iub interfaces between the RNC and the Node Bs.

In block 1304, the process may initiate a timer, for example at RLC entity at the RNC, corresponding to the allocation of packets among the plurality of MAC entities. The timer may include an entry or entries corresponding to sequence numbers of the allocated packets, and may further include an entry or entries corresponding to an identifier for the MAC entity the packets are allocated to. However, the timer may not include these associations, and may simply run in accordance with the start of the allocation.

In this way, the multi-link RLC entity may determine that a gap corresponds to skew, based on the assumption that gaps based on skew will occur during the running of the timer. That is, the multi-link RLC entity may include intelligence that knows that the flow control algorithm that allocates the PDUs among the plurality of MAC entities will cause skew, and gaps may occur for a limited time without necessitating retransmissions. Thus, in block 1308, the process may receive a Status PDU, e.g., from the UE, which indicates a gap in received packets. In block 1310, the process, may then determine whether the gap reported in the Status PDU corresponds to a running timer corresponding to the gap. If the process in block 1310 determines that the gap does not correspond to a running timer the process may proceed to block 1316, wherein the process may retransmit the RLC PDU corresponding to the gap. If the process in block 1310 determines that the gap does correspond to a running timer the process may proceed to block 1312, wherein the process may determine whether the corresponding timer has expired. If in block 1312 the process determines that the timer has expired, then the process may proceed to block 1316 wherein the process may retransmit the RLC PDU corresponding to the gap. Here, because the timer has expired, the RNC may consider that the gap corresponds to a physical layer transmission failure, because it is assumed that a gap that exists after the expiration of the timer has existed for too long a time to be likely to be caused by skew.

If in block 1312 the process determines that the timer has not expired, the process may ignore the identified gap. That is, the RNC may assume that the gap is caused by skew while the timer associated with packets corresponding to the gap is running In this way, the RLC entity at the RNC may not necessarily require storing details of the allocation among the plural MAC entities at the time of the allocation. Rather, in this example the timer mechanism may accomplish similar goals, in avoiding unnecessary retransmissions of RLC PDUs when gaps in the received PDUs at the UE correspond to out-of-order skew rather than physical layer transmission failures.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
    allocating, from a single RLC entity, a plurality of RLC PDUs among a plurality of MAC entities;
    sending the plurality of RLC PDUs to the plurality of MAC entities according to the allocation;
    storing the allocation in a memory;
    receiving a status PDU indicating a gap in sequence numbers of the RLC PDUs; and
    determining whether the gap is caused by a physical layer transmission failure or skew based on the stored allocation.

2. The method of claim 1, wherein the determining whether the gap is caused by the physical layer transmission failure or skew comprises:
    determining, in accordance with the stored allocation, a corresponding MAC entity of the plurality of MAC entities to which an RLC PDU corresponding to the gap was allocated; and
    determining that the gap is caused by the physical layer transmission failure in accordance with a comparison between a sequence number corresponding to the gap and a last sequence number acknowledged for the corresponding MAC entity.

3. The method of claim 2, wherein the determining that the gap is caused by the physical layer transmission failure further comprises determining that the sequence number corresponding to the gap is lower than the last sequence number acknowledged for the corresponding MAC entity.

4. The method of claim 2, further comprising retransmitting the RLC PDU corresponding to the gap.

5. The method of claim 1, wherein the determining whether the gap is caused by a physical layer transmission failure or skew comprises determining that the gap is caused by skew, the method further comprising:
    initiating a retransmission delay timer corresponding to the gap.

6. The method of claim 5, further comprising determining that at least a portion of the gap corresponds to a previous gap,
    wherein the initiating of the retransmission delay timer comprises inheriting a value of a previous retransmission delay timer corresponding to the previous gap.

7. The method of claim 5, further comprising retransmitting the RLC PDU corresponding to the gap after the retransmission delay timer corresponding to the gap expires.

8. The method of claim 1, wherein the determining whether the gap is caused by a physical layer transmission failure or skew comprises determining that the gap is caused by a physical layer transmission failure, in accordance with a determination that an RLC PDU corresponding to the gap has been previously retransmitted, the method further comprising:

retransmitting the RLC PDU corresponding to the gap.

9. A method of wireless communication, comprising:
allocating from a single RLC entity a plurality of RLC PDUs among a plurality of MAC entities;
sending the plurality of RLC PDUs to the plurality of MAC entities according to the allocation;
initiating a timer corresponding to the allocation; and
ignoring a status PDU that indicates a gap corresponding to the timer until the timer expires.

10. The method of claim 9, further comprising:
retransmitting at least one RLC PDU in accordance with the status PDU after the timer expires.

11. The method of claim 10, wherein the status PDU comprises RLC feedback from the UE corresponding to a gap in received ones of the RLC PDUs.

12. An apparatus for wireless communication, comprising:
means for allocating, from a single RLC entity, a plurality of RLC PDUs among a plurality of MAC entities;
means for sending the plurality of RLC PDUs to the plurality of MAC entities according to the allocation;
means for storing the allocation;
means for receiving a status PDU indicating a gap in sequence numbers of the RLC PDUs; and
means for determining whether the gap is caused by a physical layer transmission failure or skew based on the stored allocation.

13. The apparatus of claim 12, wherein the means for determining whether the gap is caused by the physical layer transmission failure or skew comprises:
means for determining, in accordance with the stored allocation, a corresponding MAC entity of the plurality of MAC entities to which an RLC PDU corresponding to the gap was allocated; and
means for determining that the gap is caused by the physical layer transmission failure in accordance with a comparison between a sequence number corresponding to the gap and a last sequence number acknowledged for the corresponding MAC entity.

14. The apparatus of claim 13, wherein the means for determining that the gap is caused by the physical layer transmission failure further comprises means for determining that the sequence number corresponding to the gap is lower than the last sequence number acknowledged for the corresponding MAC entity.

15. The apparatus of claim 13, further comprising means for retransmitting the RLC PDU corresponding to the gap.

16. The apparatus of claim 12, wherein the means for determining whether the gap is caused by a physical layer transmission failure or skew comprises means for determining that the gap is caused by skew, the apparatus further comprising:
means for initiating a retransmission delay timer corresponding to the gap.

17. The apparatus of claim 16, further comprising means for determining that at least a portion of the gap corresponds to a previous gap,
wherein the means for initiating the retransmission delay timer comprises means for inheriting a value of a previous retransmission delay timer corresponding to the previous gap.

18. The apparatus of claim 16, further comprising means for retransmitting the RLC PDU corresponding to the gap after the retransmission delay timer corresponding to the gap expires.

19. The apparatus of claim 12, wherein the means for determining whether the gap is caused by a physical layer transmission failure or skew comprises means for determining that the gap is caused by a physical layer transmission failure, in accordance with a determination that an RLC PDU corresponding to the gap has been previously retransmitted, the apparatus further comprising:
means for retransmitting the RLC PDU corresponding to the gap.

20. An apparatus for wireless communication, comprising:
means for allocating from a single RLC entity a plurality of RLC PDUs among a plurality of MAC entities;
means for sending the plurality of RLC PDUs to the plurality of MAC entities according to the allocation;
means for initiating a timer corresponding to the allocation; and
means for ignoring a status PDU that indicates a gap corresponding to the timer until the timer expires.

21. The apparatus of claim 20, further comprising:
means for retransmitting at least one RLC PDU in accordance with the status PDU after the timer expires.

22. The apparatus of claim 21, wherein the status PDU comprises RLC feedback from the UE corresponding to a gap in received ones of the RLC PDUs.

23. A non-transitory computer-readable medium comprising:
code for causing a computer to allocate, from a single RLC entity, a plurality of RLC PDUs among a plurality of MAC entities;
code for causing a computer to send the plurality of RLC PDUs to the plurality of MAC entities according to the allocation;
code for causing a computer to store the allocation in a memory;
code for causing a computer to receive a status PDU indicating a gap in sequence numbers of the RLC PDUs; and
code for causing a computer to determine whether the gap is caused by a physical layer transmission failure or skew based on the stored allocation.

24. The non-transitory computer-readable medium of claim 23, wherein the code for causing a computer to determine whether the gap is caused by the physical layer transmission failure or skew comprises:
code for causing a computer to determine, in accordance with the stored allocation, a corresponding MAC entity of the plurality of MAC entities to which an RLC PDU corresponding to the gap was allocated; and
code for causing a computer to determine that the gap is caused by the physical layer transmission failure in accordance with a comparison between a sequence number corresponding to the gap and a last sequence number acknowledged for the corresponding MAC entity.

25. The non-transitory computer-readable medium of claim 24, wherein the code for causing a computer to determine that the gap is caused by the physical layer transmission failure further comprises code for causing a computer to determine that the sequence number corresponding to the gap is lower than the last sequence number acknowledged for the corresponding MAC entity.

26. The non-transitory computer-readable medium of claim 24, wherein the computer-readable medium further comprises code for causing a computer to retransmit the RLC PDU corresponding to the gap.

27. The non-transitory computer-readable medium of claim 23, wherein the code for causing a computer to determine whether the gap is caused by a physical layer transmission failure or skew comprises code for causing a computer to determine that the gap is caused by skew, wherein the computer-readable medium further comprises:
 code for causing a computer to initiate a retransmission delay timer corresponding to the gap.

28. The non-transitory computer-readable medium of claim 27, wherein the computer-readable medium further comprises code for causing a computer to determine that at least a portion of the gap corresponds to a previous gap,
 wherein the code for causing a computer to initiate the retransmission delay timer comprises code for causing a computer to inherit a value of a previous retransmission delay timer corresponding to the previous gap.

29. The non-transitory computer-readable medium of claim 27, wherein the computer-readable medium further comprises code for causing a computer to retransmit the RLC PDU corresponding to the gap after the retransmission delay timer corresponding to the gap expires.

30. The non-transitory computer-readable medium of claim 23, wherein the code for causing a computer to determine whether the gap is caused by a physical layer transmission failure or skew comprises code for causing a computer to determine that the gap is caused by a physical layer transmission failure, in accordance with a determination that an RLC PDU corresponding to the gap has been previously retransmitted, wherein the computer-readable medium further comprises:
 code for causing a computer to retransmit the RLC PDU corresponding to the gap.

31. A non-transitory computer-readable medium comprising:
 code for causing a computer to allocate from a single RLC entity a plurality of RLC PDUs among a plurality of MAC entities;
 code for causing a computer to send the plurality of RLC PDUs to the plurality of MAC entities according to the allocation;
 code for causing a computer to initiate a timer corresponding to the allocation; and
 code for causing a computer to ignore a status PDU that indicates a gap corresponding to the timer until the timer expires.

32. The non-transitory computer-readable medium of claim 31, wherein the computer-readable medium further comprises:
 code for causing a computer to retransmit at least one RLC PDU in accordance with the status PDU after the timer expires.

33. The non-transitory computer-readable medium of claim 32, wherein the status PDU comprises RLC feedback from the UE corresponding to a gap in received ones of the RLC PDUs.

34. An apparatus for wireless communication, comprising:
 at least one processor; and
 a memory coupled to the at least one processor,
 wherein the at least one processor is configured to:
  allocate, from a single RLC entity, a plurality of RLC PDUs among a plurality of MAC entities;
  send the plurality of RLC PDUs to the plurality of MAC entities according to the allocation;
  store the allocation in the memory;
  receive a status PDU indicating a gap in sequence numbers of the RLC PDUs; and
  determine whether the gap is caused by a physical layer transmission failure or skew based on the stored allocation.

35. The apparatus of claim 34, wherein the determining whether the gap is caused by the physical layer transmission failure or skew comprises:
 determining, in accordance with the stored allocation, a corresponding MAC entity of the plurality of MAC entities to which an RLC PDU corresponding to the gap was allocated; and
 determining that the gap is caused by the physical layer transmission failure in accordance with a comparison between a sequence number corresponding to the gap and a last sequence number acknowledged for the corresponding MAC entity.

36. The apparatus of claim 35, wherein the determining that the gap is caused by the physical layer transmission failure further comprises determining that the sequence number corresponding to the gap is lower than the last sequence number acknowledged for the corresponding MAC entity.

37. The apparatus of claim 35, wherein the at least one processor is further configured to retransmit the RLC PDU corresponding to the gap.

38. The apparatus of claim 34, wherein the determining whether the gap is caused by a physical layer transmission failure or skew comprises determining that the gap is caused by skew, wherein the at least one processor is further configured to initiate a retransmission delay timer corresponding to the gap.

39. The apparatus of claim 38, wherein the at least one processor is further configured to determine that at least a portion of the gap corresponds to a previous gap,
 wherein the initiating of the retransmission delay timer comprises inheriting a value of a previous retransmission delay timer corresponding to the previous gap.

40. The apparatus of claim 38, wherein the at least one processor is further configured to retransmit the RLC PDU corresponding to the gap after the retransmission delay timer corresponding to the gap expires.

41. The apparatus of claim 34, wherein the determining whether the gap is caused by a physical layer transmission failure or skew comprises determining that the gap is caused by a physical layer transmission failure, in accordance with a determination that an RLC PDU corresponding to the gap has been previously retransmitted, wherein the at least one processor is further configured to retransmit the RLC PDU corresponding to the gap.

42. An apparatus for wireless communication, comprising:
 at least one processor; and
 a memory coupled to the at least one processor,
 wherein the at least one processor is configured to:
  allocate from a single RLC entity a plurality of RLC PDUs among a plurality of MAC entities;
  send the plurality of RLC PDUs to the plurality of MAC entities according to the allocation;
  initiate a timer corresponding to the allocation; and
  ignore a status PDU that indicates a gap corresponding to the timer until the timer expires.

43. The apparatus of claim 42, wherein the at least one processor is further configured to:
 retransmit at least one RLC PDU in accordance with the status PDU after the timer expires.

44. The apparatus of claim 43, wherein the status PDU comprises RLC feedback from the UE corresponding to a gap in received ones of the RLC PDUs.

45. The method of claim 1, wherein each of the plurality of MAC entities corresponds to a different serving cell.

46. The method of claim 1, wherein the memory storing the allocation is part of a network entity comprising the single RLC entity.

47. The method of claim 9, wherein the ignoring is performed by a network entity comprising the single RLC entity.

48. The apparatus of claim 12, wherein the apparatus is part of a network entity comprising the single RLC entity.

49. The apparatus of claim 20, wherein the apparatus is part of a network entity comprising the single RLC entity.

50. The non-transitory computer-readable medium of claim 23, wherein the memory storing the allocation is part of a network entity comprising the single RLC entity.

51. The non-transitory computer-readable medium of claim 31, wherein the ignoring is performed by a network entity comprising the single RLC entity.

52. The apparatus of claim 34, wherein the apparatus is part of a network entity comprising the single RLC entity.

53. The apparatus of claim 42, wherein the apparatus is part of a network entity comprising the single RLC entity.

\* \* \* \* \*